US012409643B2

(12) United States Patent
Kourtakis et al.

(10) Patent No.: US 12,409,643 B2
(45) Date of Patent: Sep. 9, 2025

(54) ARTICLES HAVING INORGANIC SUBSTRATES AND POLYMER FILM LAYERS

(71) Applicant: DUPONT ELECTRONICS, INC., Wilmington, DE (US)

(72) Inventors: Kostantinos Kourtakis, Media, PA (US); Benjamin Samson, Wilmington, DE (US); Kenneth Hernandez, Stoneham, MA (US); Ross S Johnson, Wilmington, DE (US); Dennis Walls, Wilmington, DE (US); Neng Xiao, Bear, DE (US); Lei Zhang, Hockessin, DE (US); Joseph Casey Johnson, Pickerington, OH (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 279 days.

(21) Appl. No.: 17/903,762

(22) Filed: Sep. 6, 2022

(65) Prior Publication Data

US 2023/0082265 A1    Mar. 16, 2023

Related U.S. Application Data

(60) Provisional application No. 63/253,364, filed on Oct. 7, 2021, provisional application No. 63/244,585, filed on Sep. 15, 2021.

(51) Int. Cl.
*B32B 27/28*    (2006.01)
*B32B 17/10*    (2006.01)

(52) U.S. Cl.
CPC ...... *B32B 27/281* (2013.01); *B32B 17/10018* (2013.01); *B32B 17/1055* (2013.01);
(Continued)

(58) Field of Classification Search
CPC ............ B32B 27/281; B32B 17/10018; B32B 17/1055; B32B 2250/03; B32B 2307/102;
(Continued)

(56) References Cited

U.S. PATENT DOCUMENTS 2,801,185 A    7/1957    Iler
4,383,105 A    5/1983    Irwin
(Continued)

FOREIGN PATENT DOCUMENTS

JP    4031624 B2    6/2001
JP    4406921 B2    2/2004
JP    2015178237 A * 10/2015

OTHER PUBLICATIONS

A.V. Patsis et al., "Amino Organo Alkoxysilanes in Organic Solvents for Promoting Adhesion of Polyimide Films to Silicon Substrates", J Adhesion, 25, 145-157, 1988.
(Continued)

*Primary Examiner* — John D Freeman

(57) ABSTRACT

In a first aspect, an article includes an inorganic substrate and a polymer film layer. The inorganic substrate includes a material including a ceramic, a glass, a glass-ceramic or a mixture thereof. The material includes a metal cation selected from the group consisting of silicon, aluminum, titanium, zirconium, tantalum, niobium and mixtures thereof and oxygen. The polymer film layer includes a polymer including an imide group. From an interface where the inorganic substrate contacts the polymer film layer, a line-profile of a CNO- signal from negative secondary ion mass spectroscopy decreases as it moves away from the interface and into the bulk of the polymer film layer.

25 Claims, 2 Drawing Sheets

(52) U.S. Cl.
CPC ..... *B32B 2250/03* (2013.01); *B32B 2307/102* (2013.01); *B32B 2307/412* (2013.01); *B32B 2307/558* (2013.01); *B32B 2571/02* (2013.01)

(58) Field of Classification Search
CPC ........ B32B 2307/412; B32B 2307/558; B32B 2571/02; B32B 27/08; B32B 2255/10; B32B 2255/26; B32B 2571/00; B32B 9/005; B32B 9/043; B32B 9/045; B32B 17/10; B32B 2307/581; B32B 27/16
See application file for complete search history.

(56) References Cited

U.S. PATENT DOCUMENTS

| | | |
|---|---|---|
| 4,522,958 A | 6/1985 | Das et al. |
| 5,166,308 A | 11/1992 | Kreuz et al. |
| 5,298,331 A | 3/1994 | Kanakarajan et al. |
| 5,648,407 A | 7/1997 | Goetz et al. |
| 6,931,999 B2 | 8/2005 | Stanford |
| 7,790,347 B2 | 9/2010 | Leatherdale et al. |
| 8,312,739 B2 | 11/2012 | Lee et al. |
| 8,561,429 B2 | 10/2013 | Allan et al. |
| 10,071,933 B2 | 9/2018 | Wang et al. |
| 2015/0159044 A1 | 6/2015 | Bae et al. |
| 2017/0369654 A1 | 12/2017 | Kao et al. |
| 2018/0228002 A1 | 8/2018 | Murashige et al. |
| 2019/0276669 A1* | 9/2019 | Kourtakis ............ C09D 179/08 |

OTHER PUBLICATIONS

Y. Liu et al., "Chemical cross-linking modification of polyimide membranes for gas separation", J Membr Sci 189, pp. 231-239, 2001.

* cited by examiner

ARTICLES HAVING INORGANIC SUBSTRATES AND POLYMER FILM LAYERS

FIELD OF DISCLOSURE

The field of this disclosure is articles having inorganic substrates and polymer film layers.

BACKGROUND OF THE DISCLOSURE

Inorganic (e.g., ceramic and glass) laminated products have long been used for a wide variety of applications, such as armor for buildings, vehicles and personnel, as well as safety glass for transparent applications. Beyond the well-known, every day automotive safety glass used in windshields, laminated glass is used as windows for trains, airplanes, ships, and nearly every other mode of transportation. Safety glass is characterized by high impact and penetration resistance and does not scatter glass shards and debris when shattered.

Safety glass typically consists of a sandwich of two glass sheets or panels bonded together with an interlayer of a polymeric film or sheet, which is placed between the two glass sheets. One or both glass sheets may be replaced with optically clear rigid polymeric sheets, such as sheets of polycarbonate materials. Safety glass has further evolved to include multiple layers of glass and polymeric sheets bonded together with interlayers of polymeric films or sheets.

The interlayer is typically a relatively thick polymer sheet, which exhibits toughness and bondability to provide adhesion to the glass in the event of a crack or crash. In general, it is desirable that these polymeric interlayers possess a combination of characteristics including very high optical clarity, low haze, high impact resistance, high penetration resistance, excellent ultraviolet light resistance, good long-term thermal stability, excellent adhesion to glass and other rigid polymeric sheets, low ultraviolet light transmittance, low moisture absorption, high moisture resistance, and excellent long term weatherability, among other requirements.

A recent trend has been the use of glass-laminated products in the construction of homes and office structures. The use of architectural glass has expanded rapidly over the years as designers incorporate more glass surfaces into buildings. Threat resistance has become an ever-increasing requirement for architectural glass laminated products. These newer products are designed to resist both natural and man-made disasters. Examples of these needs include the recent developments of hurricane resistant glass, now mandated in hurricane susceptible areas, theft resistant glazings, and the more recent blast resistant glass-laminated products designed to protect buildings and their occupants. Some of these products have great enough strength to resist intrusion even after the glass laminate has been broken; for example, when a glass laminate is subjected to high force winds and impacts of flying debris, which can occur in a hurricane, or where there are repeated impacts on a window by a criminal attempting to break into a vehicle or structure.

A smooth glass surface presents a challenge for adhering a polymer layer without the use of adhesives. Silanization is a well know method for introducing a variety of functional groups onto a glass surface. For example, a coating solution having an amino-functional silane coupling agent can be deposited onto a glass substrate and dried to remove the solvent, resulting in a glass surface with a modified surface energy.

Polyimide films can be adhered to inorganic substrates, such as silicon substrates, by coating a polyamic acid solution onto a silicon substrate that has been functionalized using an amino-functional silane coupling agent (A. V. Patsis and S. Cheng, *J Adhesion* (1988), 25, 145-157). When the solution is applied to the treated surface, the silane coupling agent interacts with the amic acid through interactions between carboxylic acid and amine groups on the polyamic acid and silanol groups on the silicon substrate. During subsequent curing, the polyamic acid is converted to the polyimide.

DETAILED DESCRIPTION

Figure 1A:
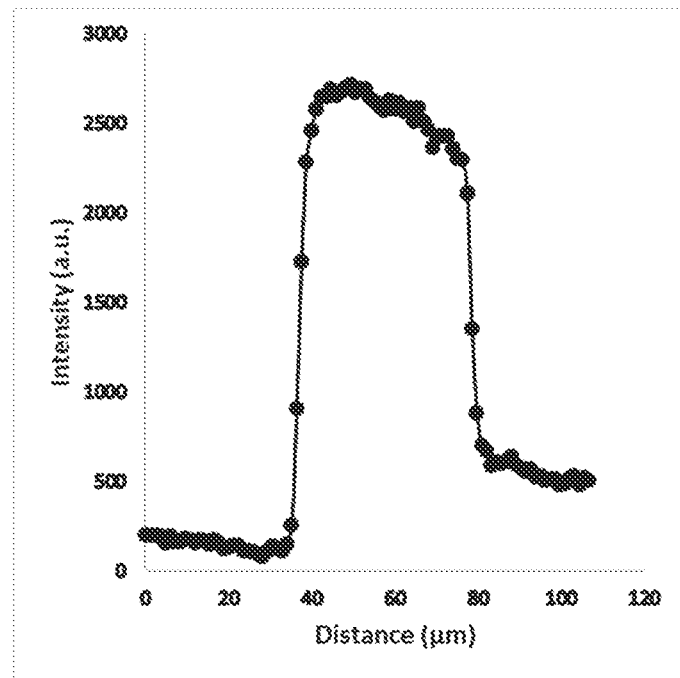
FIGS. 1A and 1B are the cross-sectional intensity profiles of E13 for CN− species and CNO− species, respectively.

In a first aspect, an article includes an inorganic substrate and a polymer film layer. The inorganic substrate includes a material including a ceramic, a glass, a glass-ceramic or a mixture thereof. The material includes a metal cation selected from the group consisting of silicon, aluminum, titanium, zirconium, tantalum, niobium and mixtures thereof and oxygen. The polymer film layer includes a polymer including an imide group. From an interface where the inorganic substrate contacts the polymer film layer, a line-profile of a CNO− signal from negative secondary ion mass spectroscopy decreases as it moves away from the interface and into the bulk of the polymer film layer.

In a second aspect, an impact-resistant article includes the article of the first aspect.

In a third aspect, a penetration-resistant article includes the article of the first aspect.

In a fourth aspect, a sound-reducing article includes the article of the first aspect.

In a fifth aspect, an article includes an inorganic substrate and a polymer film layer. The inorganic substrate includes a material including a ceramic, a glass, a glass-ceramic or a mixture thereof. The material includes a metal cation selected from the group consisting of silicon, aluminum, titanium, zirconium, tantalum, niobium and mixtures thereof and oxygen. The polymer film layer includes a polymer including an imide group, wherein, a Mode I Interlaminar Fracture Toughness ($G_{Ic}$) between the polymer film layer and the inorganic substrate layer is 9 J/m² or more.

In a sixth aspect, an impact-resistant article includes the article of the fifth aspect.

In a seventh aspect, a penetration-resistant article includes the article of the fifth aspect.

In a eighth aspect, a sound-reducing article includes the article of the fifth aspect.

In a ninth aspect, a process is described for forming an article, wherein the article includes an inorganic substrate and a polymer film layer. The inorganic substrate includes a material including a ceramic, a glass, a glass-ceramic or a mixture thereof. The material includes a metal cation selected from silicon, aluminum, titanium, zirconium, tantalum, niobium and mixtures thereof, and oxygen. The polymer film layer includes a polymer comprising an imide group. The process includes:

(a) applying an amine reagent to a surface of the inorganic substrate, a surface of the polymer film layer, or both;

(b) contacting the inorganic substrate with the polymer film layer, such that a surface having an amine reagent is at an interface between the inorganic substrate and the polymer film layer; and (c) applying heat and pressure to the article.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Any one of a number of polymer manufacturing processes may be used to prepare polymer films. It would be impossible to discuss or describe all possible manufacturing processes useful in the practice of the present invention. It should be appreciated that the monomer systems of the present invention are capable of providing the above-described advantageous properties in a variety of manufacturing processes. The compositions of the present invention can be manufactured as described herein and can be readily manufactured in any one of many (perhaps countless) ways of those of ordinarily skilled in the art, using any conventional or non-conventional manufacturing technology.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

It will be understood that although the terms first, second, third, etc. may be used herein to describe various elements, components, regions, layers and/or sections, these elements, components, regions, layers, and/or sections should not be limited by these terms. These terms are only used to distinguish one element, component, region, layer and/or section from another element, component, region, layer and/or section. Thus, a first element, component, region, layer and/or section could be termed a second element, component, region, layer and/or section without departing from the teachings of the present invention. Similarly, the terms "top"

and "bottom" are only relative to each other. It will be appreciated that when an element, component, layer or the like is inverted, what is the "bottom" before being inverted would be the "top" after being inverted, and vice versa. When an element is referred to as being "on" or "disposed on" another element, it means positioning on or below the object portion, but does not essentially mean positioning on the upper side of the object portion based on a gravity direction, and it can be directly on the other element or intervening elements may be present therebetween. In contrast, when an element is referred to as being "directly on" or "disposed directly on" another element, there are no intervening elements present.

Further, it will also be understood that when one element, component, region, layer and/or section is referred to as being "between" two elements, components, regions, layers and/or sections, it can be the only element, component, region, layer and/or section between the two elements, components, regions, layers and/or sections, or one or more intervening elements, components, regions, layers and/or sections may also be present.

Organic Solvents

Useful organic solvents for the synthesis of the polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred.

Useful organic solvents include: N-methylpyrrolidone (NMP), dimethylacetamide (DMAc), methyl ethyl ketone (MEK), N,N'-dimethyl-formamide (DMF), dimethyl sulfoxide (DMSO), tetramethyl urea (TMU), glycol ethyl ether, diethyleneglycol diethyl ether, 1,2-dimethoxyethane (monoglyme), diethylene glycol dimethyl ether (diglyme), 1,2-bis-(2-methoxyethoxy) ethane (triglyme), gamma-butyrolactone, and bis-(2-methoxyethyl) ether, tetrahydrofuran (THF), ethyl acetate, hydroxyethyl acetate glycol monoacetate, acetone and mixtures thereof. In one embodiment, preferred solvents include N-methylpyrrolidone (NMP) and dimethylacetamide (DMAc).

Diamines

In one embodiment, a suitable diamine for forming the polymer can include an aliphatic diamine, such as 1,2-diaminoethane, 1,6-diaminohexane (HMD), 1,4-diaminobutane, 1,5 diaminopentane, 1,7-diaminoheptane, 1,8-diaminooctane, 1,9-diaminononane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, trans-1,4-diaminocyclohexane (CHDA), isophoronediamine (IPDA), bicyclo[2.2.2]octane-1,4-diamine and combinations thereof. Other aliphatic diamines suitable for practicing the invention include those having six to twelve carbon atoms or a combination of longer chain and shorter chain diamines so long as both developability and flexibility of the polymer are maintained. Long chain aliphatic diamines may increase flexibility.

In one embodiment, a suitable diamine for forming the polymer can include an alicyclic diamine (can be fully or partially saturated), such as a cyclobutane diamine (e.g., cis- and trans-1,3-diaminocyclobutane, 6-amino-3-azaspiro[3.3] heptane, and 3,6-diaminospiro[3.3]heptane), bicyclo[2.2.1] heptane-1,4-diamine, isophoronediamine, and bicyclo [2.2.2]octane-1,4 diamine. Other alicyclic diamines can include cis-1,4 cyclohexane diamine, trans-1,4 cyclohexane diamine, 1,4-bis(aminomethyl)cyclohexane, 4,4'-methylenebis(cyclohexylamine), 4,4'-methylenebis(2-methyl-cyclohexylamine), bis(aminomethyl)norbornane.

In one embodiment, a suitable diamine for forming the polymer can include a fluorinated aromatic diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9,9'-bis(4-aminophenyl) fluorene, 4,4'-trifluoromethyl-2,2'-diaminobiphenyl, 4,4'-oxy-bis-[2-trifluoromethyl)benzene amine](1,2,4-OBABTF), 4,4'-oxy-bis-[3-trifluoromethyl)benzene amine], 4,4'-thio-bis-[(2-trifluoromethyl)benzene-amine], 4,4'-thio-bis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-di-amino-4-methyl-2',3',5',6'-tetrafluoro-4'-tri-fluoromethyldi-phenyloxide, 2,2-Bis[4'(4"-aminophenoxy)phenyl] phthalein-3',5'-bis(trifluoromethyl)anilide (6FADAP) and 3,3',5,5'-tetrafluoro-4,4'-diamino-diphenylmethane (TFDAM).

Other useful diamines for forming the polymer can include p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines for forming the polymer can include 1,2-bis-(4-aminophenoxy)benzene, 1,3-bis-(4-aminophenoxy) benzene (RODA), 1,2-bis-(3-aminophenoxy) benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene and 2,4,6-trimethyl-1,3-diaminobenzene.

Dianhydrides

In one embodiment, any number of suitable dianhydrides can be used in forming the polymer. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyltetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyltetracarboxylic dianhydride, 2,3,3',4'-biphenyltetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic dianhydride, ethylene tetracarboxylic dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl)propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride and thiophene-2,3,4,5-tetracarboxylic dianhydride.

In one embodiment, a suitable dianhydride can include an alicyclic dianhydride, such as cyclobutane-1,2,3,4-tetracarboxylic diandydride (CBDA), 1,2,4,5-cyclohexanetetracarboxylic dianhydride, 1,2,3,4-cyclohexanetetracarboxylic dianhydride, 1,2,3,4-tetramethyl-1,2,3,4-cyclobutanetetracarboxylic dianhydride, 1,2,3,4-cyclopentanetetracarboxylic dianhydride (CPDA), hexahydro-4,8-ethano-1H,3H-benzo[1,2-c:4,5-c']difuran-1,3,5,7-tetrone (BODA), 3-(carboxymethyl)-1,2,4-cyclopentanetricarboxylic 1,4:2,3-dianhydride (TCA), and meso-butane-1,2,3,4-tetracarboxylic dianhydride. In one embodiment, an alicyclic dianhydride can be present in an amount of about 70 mole percent or less, based on the total dianhydride content of the polymer.

In one embodiment, a suitable dianhydride for forming the polymer can include a fluorinated dianhydride, such as 4,4'-(hexafluoroisopropylidene)diphthalic anhydride (6FDA) and 9,9-bis (trifluoromethyl)-2,3,6,7-xanthene tetracarboxylic dianhydride.

In one embodiment, poly(amide-imides) can be produced from acyl chloride-containing monomers such as terephthaloyl chloride (TPCI), isophthaloyl chloride (IPCI), biphenyl dicarbonyl chloride (BPCI), naphthalene dicarbonyl chloride, terphenyl dicarbonyl chloride, 2-fluoro-terephthaloyl chloride and trimellitic anhydride.

In one embodiment, poly(ester-imides) can be produced from polyols which can react with carboxylic acid or the ester acid halides to generate ester linkages.

The dihydric alcohol component may be almost any alcoholic diol containing two esterifiable hydroxyl groups. Mixtures of suitable diols may also be included. Suitable diols for use herein include for example, ethylene glycol, propylene glycol, 1,4-butane diol, 1,5-pentane diol, neopenty glycol, etc.

The polyhydric alcohol component may be almost any polyhydric alcohol containing at least 3 esterifiable hydroxyl groups in order to provide the above described synthesis process advantages of this invention. Mixtures of such polyhydric alcohols may suitably be employed. Suitable polyhydric alcohols include, for example, tris(2-hydroxyethyl) isocyanurate, glycerine, 1,1,1-trimethylolethane, 1,1,1-trimethylolpropane, and their mixtures.

In some cases, useful diamine and dianhydride monomers contain ester groups. Examples of these monomers are diamines such as 4-aminophenyl 4-aminobenzoate, 4-amino-3-methylphenyl-4-aminobenzoate and dianhydrides such as p-phenylene bis(trimellitate) dianhydride.

In some cases, useful diamine and dianhydride monomers contain amide groups. Examples of these monomers are diamines such as 4, 4'-diaminobenzamide (DABAN), and dianhydrides such as N,N'-(2,2'-Bis(trifluoromethyl)-[1,1'-biphenyl]-4,4'-diyl)bis(1,3-dioxo-1,3-dihydroisobenzofuran-5-carboxamide) and N,N'-(9H-Fluoren-9-ylidenedi-4,1-phenylene)bis[1,3-dihydro-1,3-dioxo-5-isobenzofurancarboxamide].

Higher order copolymers having an imide group can include any of the monomers described above.

Amine Reagents

In one embodiment, an amine reagent, such as a primary or secondary amine, can be used to adhere a polymer layer having a polymer with an imide group to an inorganic substrate. While not being bound to any theory, it is believed that the amine reagent reacts with the imide to create a covalent bond to the imide-containing polymer by creating an amide bond. Previous references of crosslinking reactions indicate this chemistry is facile and can occur at room temperature with primary or secondary amine crosslinking agents (see, for example, Y. Liu et al, *J Membr Sci* 189 (2001), pp. 231-239).

In one embodiment, an alkoxide-containing amine reagent can also be used, which can directly interact with inorganic surfaces by the interaction of the alkoxide with —SiOH groups. In addition, the amine groups can interact with inorganic surfaces and the —SiOH groups present on the surface to help improve adhesion.

In one embodiment, the imide-containing polymer can have a range of glass transition temperatures ($T_g$'s). Typically, the lamination conditions (heat and applied pressure) will be, as a lower limit, close to the glass transition temperature of the polymer film layer. In one embodiment, a polymer film layer can have a $T_g$ of about 300° C. or less. In one embodiment, lamination is carried out at a temperature in a range of from about 20 degrees below to about 50 degrees above the $T_g$ of the polymer film layer. For amorphous or semi-crystalline polymers, $T_g$ can be affected by several parameters. An increase in molecular weight leads to a decrease in chain end concentration resulting in a decreased free volume at the end group region and increase in $T_g$. The insertion of rigid or inflexible groups in the chain or bulky and inflexible side or pendant groups will increase the $T_g$ of the polymer due to a decrease in chain mobility. Conversely, imide-containing polymers which contain monomers which are flexible and possess many degrees of freedom will lower $T_g$. For these imide-containing polymers, aliphatic imide diamines such as n-alkyl diamines will increase chain mobility, increase free volume (volume not occupied by the polymer) and lower $T_g$. Likewise, an increase in crosslinking decreases chain mobility, leading to a decrease in free volume and increase in $T_g$. In addition, the presence of polar groups increases intermolecular forces, inter-chain attraction and cohesion, leading to a decrease in free volume resulting in an increase in $T_g$.

In one embodiment, the amines that can be derived from metal alkoxides contain at least one primary or secondary amine; the metal atom can be, for instance, silicon, titanium, aluminum, zirconium, niobium or tantalum. In one embodiment, mixtures of alkoxides and metal alkoxide clusters containing more than one metal cation can also be used. In one embodiment, metal alkoxides containing a primary amine, such as amine-containing alkoxysilanes, can be prehydrolyzed to produce amine-containing oligomers, essentially amplifying the number of amines at the interface.

In one embodiment, at least one of a hydrolysis and condensation product of the amine precursor, if it contains an alkoxide group, can be used. As used herein, a "hydrolysis product" or a "hydrosylate" refers to an alkoxide in which at least one of the alkoxide substituents have been replaced by a hydroxyl group. For example, in the case of alkoxysilanes, condensates can form when two hydroxyl groups attached to Si condense to form direct Si—O—Si linkages. In this way, alkoxysilane oligomers can form.

In one embodiment, a hydrosylate and/or condensate can be formed by contacting the amine-containing alkoxide with water. In one embodiment, a hydrosylate and/or condensate can be formed by contacting the amine-containing alkoxide with from about 1 to about 200 moles of water per mole of hydrolyzable functional group bonded to the silicon of the oxysilane.

In one embodiment, hydrosylate and/or condensate can be formed by contacting the oxysilane with water in the presence of a lower alkyl alcohol solvent. Representative lower alkyl alcohol solvents include aliphatic and alicyclic C1-C5 alcohols such as methanol, ethanol, n-propanol, iso-propanol and cyclopentanol. In one embodiment, the lower alkyl alcohol solvent is ethanol or methanol.

In one embodiment, hydrolysate and/or condensate can be formed by contacting the oxysilane with water in the presence of an organic acid that catalyzes hydrolysis of one or more alkoxide substituents and further may catalyze condensation of the resultant hydrosylates. The organic acids catalyze hydrolysis of alkoxide substituents, such as alkoxy and aryloxy, and result in the formation of hydroxyl (silanol) groups in their place. Organic acids comprise the elements carbon, oxygen and hydrogen, optionally nitrogen and sulfur, and contain at least one labile (acidic) proton. Examples of organic acids include carboxylic acids such as acetic acid, maleic acid, oxalic acid, and formic acid, as well as sulfonic acids such as methanesulfonic acid and toluene sulfonic acid. In one embodiment, the organic acids can have a $pK_a$ of at least about 4.7. In one embodiment an organic acid is acetic acid.

In some embodiments, polyamine oligomers such as polyetheramines (e.g. Jeffamine® products from Huntsman Corp., The Woodlands, TX) and other polyamine monomers (e.g. 1,3,5-tris(4-aminophenoxy)benzene) can be used. These reagents are polyamine oligomers that can interact with the polymer film layer surface and with —SiOH and other functional groups on the inorganic substrate surface.

Polyamine siloxanes can also be used to promote adhesion between imide-containing polymer layers and inorganic substrates. Examples include various silamines which are amino-functionalized siloxanes and silicones. Examples include poly[(1,3-(N,N-dimethylamino)-2-propoxy)siloxane], poly[(methyl-3-amino-1-propoxy)siloxane], poly[(1,3-(N,N-dimethylamino)-2-propoxy)siloxane], bis(trimethylsiloxy)-1,3-dimethyl-1,3-(N,N-(1',e'-dimethylamino)-2'-propoxy)siloxane.

Crosslinking Precursors

In one embodiment, crosslinking precursors are used in coating solutions that form polymer films. By crosslinking the polymer, the polymer film may have improved mechanical properties, as well as improved chemical resistance. In some embodiments, an amine can be useful as both an amine reagent and a crosslinking precursor. Crosslinking precursors can include polyetheramines, such as Jeffamine® D-230, Jeffamine® D-400, Jeffamine® D-2000, Jeffamine® D-2010, Jeffamine® D-4000, Jeffamine® ED-600, Jeffamine® ED-900, Jeffamine® D-2003, Jeffamine® EDR-148, Jeffamine® THF-100, Jeffamine® THF-170, Jeffamine® SD-2001, Jeffamine® D-205 and Jeffamine® RFD-270.

In one embodiment, crosslinking precursors can include aromatic primary diamines, such as m-xylylene diamine, and p-xylylene diamine.

In one embodiment, crosslinking precursors can include aliphatic primary diamines, such as 1,2-diaminoethane, 1,6-diaminohexane, 1,4-diaminobutane, 1,7-diaminoheptane, 1,8-diaminooctane, 1,9-diaminononane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, isophoronediamine, bicyclo[2.2.2]octane-1,4-diamine and combinations thereof. Other aliphatic diamines suitable for practicing the invention include those having six to twelve carbon atoms or a combination of longer chain and shorter chain diamines or cycloaliphatic diamines.

In one embodiment, crosslinking precursors can include secondary amines, such as piperazine, N,N'-diisopropylethylenediamine, N,N'-diisopropyl-1,3-propanediamine and N,N'-dimethyl-1,3-propanediamine, and triamines, such as 2,4,6-triaminopyrimidine (TAP), melamine, diethylenetriamine, Jeffamine® T-403, Jeffamine® T-3000, Jeffamine® T-5000. In addition, many diamines that may be used as a diamine monomer for polymers, as described above, may also be useful as crosslinking precursors.

In one embodiment, crosslinking precursors can include one or more amine groups that, individually, are either reactive or passivated towards crosslinking of the polymer. When containing an amine group that is passivated, the crosslinking precursor can subsequently be chemically converted, thermally converted, photo-converted or dissociated to form at least two reactive amines. In one embodiment, a passivated crosslinking precursor that is thermally converted can also function as an amine reagent to adhere the polymer film layer to the inorganic substrate. In one embodiment, a single heating step can be used to both crosslink the polymer and adhere it to the substrate.

In one embodiment, a crosslinking precursor can contain alkyl chains as passivating groups, such as N-alkyl or N,N-dialkyl chains, for example, methyl and tert-butyl chains. In one embodiment, a crosslinking precursor can contain an aromatic passivating group, such as N-aryl and N,N-diaryl groups. In one embodiment, a crosslinking precursor can be a compound that contains a benzyl passivating group. In one embodiment a crosslinking precursor can be a compound that contains a silyl derivative as the passivating group, such as tert-butyldiphenylsilyl. Many functional groups can act as protecting groups for amines towards soluble polymers having an imide group. See, for example, P. G. M. Wuts and T. W. Greene, *Greene's Protective Groups in Organic Synthesis,* 4th Ed., John Wiley & Sons, Inc. (2007) ("*Greene's*").

In one embodiment, a crosslinking precursor can contain carbamates as passivating groups. Carbamate passivating groups can be converted to form reactive amines by a variety of methods. Many carbamates can be converted to form reactive amines through the application of heat at temperatures typically greater than 150° C. A variety of chemical routes can also be used to convert a carbamate functional group to form a reactive amine. For example, the introduction of a base, such as tert-butyl alcohol, or an acid, such as phosphoric acid or trifluoroacetic acid, can be used to convert the carbamate to form a reactive amine. Photo-induced reactions can also be used to cleave carbamates to form reactive amines. A variety of methods of converting a range of carbamates are described in *Greene's*. In one embodiment, a crosslinking precursor can be a compound that contains carbamate passivating groups that are thermally cleavable, such as tert-butyloxycarbonyl, fluorenylmethoxycarbonyl, and benzyl carbamate, or photo-cleavable, such as 3,5-dimethoxybenzyl carbamate, m-nitrophenyl carbamate, and o-nitrobenzyl carbamate.

In one embodiment, a crosslinking precursor can contain an amide passivating group that can be cleaved to form a reactive amine through the introduction of a different chemical species. For example, the different chemical species can include a base such as sodium or potassium hydroxide, ammonia, or a tertiary amine. In other instances, acids such as hydrochloric acid, or enzymes such as penicillin acylase or α-chymotrypsin can be used to cleave the amide to form a reactive amine.

In one embodiment, a crosslinking precursor containing an amide passivating group can be photo-cleaved, such as by irradiating with 245 nm light, or thermally cleaved at temperatures of greater than 65° C. A broad range of amides, such as those described in Greene's, can be used as crosslinking precursors. In one embodiment, a crosslinking precursor can be a compound that contains an amide passivating group, such as acetamide, trifluoroacetamide, formamide, sulfonamide, such as p-toluenesulfonamide, trichloroacetamide, chloroacetamide, phenylacetamide, 3-phenylpropanamide, 3-pyridylcarboxamide, N-benzoylphenylalanyl, and benzamide.

In one embodiment, a crosslinking precursor can be an ammonium salt made from an acid such as acetic acid, butyric acid, pivalic acid, hydrochloric acid or sulfuric acid. An ammonium salt which can be used to passivate an amine in the crosslinking precursor can be formed by the addition of organic and/or mineral Brønsted acids. The direct reaction of the acid and the crosslinking precursor, containing an amine, will form the ammonium salt. The ammonium salt can be dissociated to allow for crosslinking by the application of heat. The kinetic inhibition is also controlled by the acid-ammonium equilibrium constant. If there is not sufficient acid in solution, as determined by the acid-ammonium equilibrium constant, the ammonium salt can be dissociated to form a reactive amine in the crosslinking precursor. In one embodiment, an ammonium salt can be made from the reaction of the amine with acetic acid or trifluoroacetic acid, and then dissociated with heat.

In one embodiment, the crosslinking precursor is selected from a single multifunctional precursor, a combination of multiple single-functional precursors, or a mixture thereof.

Polymer Films

In one embodiment, a polymer film containing a polymer having an imide group can be produced by combining a diamine and a dianhydride (monomer or other polyimide precursor form) together with a solvent to form a polyamic acid (also called a polyamide acid) solution. The dianhydride and diamine can be combined in a molar ratio of about 0.90 to 1.10. The molecular weight of the polyamic acid formed therefrom can be adjusted by adjusting the molar ratio of the dianhydride and diamine.

In one embodiment, a polyamic acid casting solution is derived from the polyamic acid solution. The polyamic acid casting solution, and/or the polyamic acid solution, can optionally be combined with conversion chemicals like: (i) one or more dehydrating agents, such as, aliphatic acid anhydrides (acetic anhydride, etc.) and/or aromatic acid anhydrides; and (ii) one or more catalysts, such as, aliphatic tertiary amines (triethyl amine, etc.), aromatic tertiary amines (dimethyl aniline, etc.) and heterocyclic tertiary amines (pyridine, picoline, isoquinoline, etc.). The anhydride dehydrating material it is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used. Nanoparticles, dispersed or suspended in solvent as described above, are then added to the polyamic acid solution.

In one embodiment, a conversion chemical can be an imidization catalyst (sometimes called an "imidization accelerator") that can help lower the imidization temperature and shorten the imidization time. Typical imidization catalysts can range from bases such as imidazole, 1-methylimidazole, 2-methylimidazole, 1,2-dimethylimidazole, 2-phenylimidazole, benzimidazole, isoquinoline, substituted pyridines such as methyl pyridines, lutidine, and trialkylamines and hydroxy acids such as isomers of hydroxybenzoic acid. The ratio of these catalysts and their concentration in the polyamic acid layer will influence imidization kinetics and the film properties.

In one embodiment, the polyamic acid solution, and/or the polyamic acid casting solution, is dissolved in an organic solvent at a concentration from about 5.0 or 10% to about 15, 20, 25, 30, 35 or 40% by weight.

The solvated mixture (the polyamic acid casting solution) can then be cast or applied onto a support, such as an endless belt or rotating drum, to give a film. Alternatively, it can be cast on a polymeric carrier such as PET, other forms of Kapton® polyimide film (e.g., Kapton® HN or Kapton® OL films) or other polymeric carriers. Next, the solvent-containing film can be converted into a self-supporting film by heating at an appropriate temperature (thermal curing). The film can then be separated from the support, oriented such as by tentering, with continued heating (drying and curing) to provide a polymer film.

Useful methods for producing polymer films containing a polyimide can be found in U.S. Pat. Nos. 5,166,308 and 5,298,331, which are incorporate by reference into this specification for all teachings therein. Numerous variations are also possible, such as, (a) A method wherein the diamine components and dianhydride components are preliminarily mixed together and then the mixture is added in portions to a solvent while stirring.

(b) A method wherein a solvent is added to a stirring mixture of diamine and dianhydride components. (contrary to (a) above)

(c) A method wherein diamines are exclusively dissolved in a solvent and then dianhydrides are added thereto at such a ratio as allowing to control the reaction rate.

(d) A method wherein the dianhydride components are exclusively dissolved in a solvent and then amine components are added thereto at such a ratio to allow control of the reaction rate.

(e) A method wherein the diamine components and the dianhydride components are separately dissolved in solvents and then these solutions are mixed in a reactor.

(f) A method wherein the polyamic acid with excessive amine component and another polyamic acid with excessive dianhydride component are preliminarily formed and then reacted with each other in a reactor, particularly in such a way as to create a non-random or block copolymer.

(g) A method wherein a specific portion of the amine components and the dianhydride components are first reacted and then the residual diamine components are reacted, or vice versa.

(h) A method wherein the conversion chemicals (catalysts) are mixed with the polyamic acid to form a polyamic acid casting solution and then cast to form a gel film.

(i) A method wherein the components are added in part or in whole in any order to either part or whole of the solvent, also where part or all of any component can be added as a solution in part or all of the solvent.

(j) A method of first reacting one of the dianhydride components with one of the diamine components giving a first polyamic acid. Then reacting another dianhydride component with another amine component to give a second polyamic acid. Then combining the amic acids in any one of a number of ways prior to film formation.

In one embodiment, the polyamic acid solution can be heated, optionally in the presence of an imidization catalyst, to partially or fully imidize the polyamic acid, converting it to a polymer having an imide group. Temperature, time, and the concentration and choice of imidization catalyst can impact the degree of imidization of the polyamic acid solution. Preferably, the solution should be substantially imidized. In one embodiment, for a substantially polymerized solution, greater than 85%, greater than 90%, or greater than 95% of the amic acid groups are converted to the polymer having an imide group, as determined by infrared spectroscopy.

In one embodiment, the solvated mixture (the substantially imidized solution) can be cast to form a polymer film. In another embodiment, the solvated mixture (the first substantially imidized solution) can be precipitated with an antisolvent, such as water or alcohols (e.g., methanol, ethanol, isopropyl alcohol), and the solid polymer resin can be isolated. For instance, isolation can be achieved through filtration, decantation, centrifugation and decantation of the supernatant liquid, distillation or solvent removal in the vapor phase, or by other known methods for isolating a solid precipitate from a slurry. In one embodiment, the precipitate can be washed to remove the catalyst. After washing, the precipitate may be substantially dried, but need not be completely dry. The polymer precipitate can be re-dissolved in a second solvent, such as methyl isobutyl ketone (MIBK), methyl ethyl ketone (MEK), ethyl acetate, methyl acetate, ethyl formate, methyl formate, tetrahydrofuran, acetone, DMAc, NMP and mixtures thereof, to form a second substantially imidized solution (a casting solution), which can be cast to form a polymer film.

In one embodiment, a substantially polymerized solution is formed using monomers (diamines or dianhydrides) with structural characteristics important for solubility, including flexible linkages, such as, but not limited to, aliphatic spacers, ethers, thioethers, substituted amines, amides, esters, and ketones, weak intermolecular interactions, bulky substitutions, non-coplanarity, non-linearity and asymmetry. Examples of diamines that incorporate some of these characteristics are aliphatic diamines, such as HMD, CHDA and IPDA, and aromatic diamines, such as MTB TFMB, MPD, RODA, BAPP, and 3,4-ODA. Examples of dianhydrides that incorporate some of these characteristics are 6FDA, BPADA, ODPA, DSDA and BODA.

In one embodiment, the solvated mixture (the substantially imidized solution) can be mixed with a crosslinking precursor and a colorant, such as a pigment or a dye, and then cast to form a polymer film. In one embodiment, the colorant may be a low conductivity carbon black. In another embodiment, the solvated mixture (the first substantially imidized solution) can be precipitated with an antisolvent, such as water or alcohols (e.g., methanol, ethanol, isopropyl alcohol). In one embodiment, the precipitate can be washed to remove the catalyst. After washing, the precipitate may be substantially dried, but need not be completely dry. The polymer precipitate can be re-dissolved in a second solvent, such as methyl isobutyl ketone (MIBK), methyl ethyl ketone (MEK), tetrahydrofuran (THF), cyclopentanone, ethyl acetate, acetone, DMAc, NMP and mixtures thereof, to form a second substantially imidized solution (a casting solution). To the second substantially imidized solution, a crosslinking precursor and a colorant can be added, which can then be cast to form a polymer film. In one embodiment, a polymer film contains a crosslinked polymer in a range of from about 80 to about 99 wt %. In some embodiments, the polymer film contains between and including any two of the following: 80, 85, 90, 95 and 99 wt % crosslinked polymer. In yet another embodiment, the polymer film contains about 91 to about 98 wt % crosslinked polymer.

In one embodiment, the substantially imidized polymer solution can be cast or applied onto a support, such as an endless belt or rotating drum, to form a film. Alternatively, it can be cast on a polymeric carrier such as PET, other forms of Kapton® polyimide film (e.g., Kapton® HN or Kapton® OL films) or other polymeric carriers. Next, the solvent-containing film can be converted into a film by heating to partially or fully remove the solvent. In some aspects of the invention, the film is separated from the carrier before drying to completion. Final drying steps can be performed with dimensional support or stabilization of the film. In other aspects, the film is heated directly on the carrier.

In one embodiment, poly(amide-imides) can be formed by the reaction of acyl chlorides with diamines and anhydrides.

In one embodiment, poly(ester-imides), or poly(amide-imides), can be formed using ester-containing, or amide-containing, diamines or dianhydrides in similar processes as those described above. In one embodiment, a poly(ester-imide) can be formed by direct reaction of an ester-containing diamine or dianhydride. In one embodiment, a poly(amide-imide) can be formed by direct reaction of an amide-containing diamine or dianhydride.

In one embodiment, poly(ester-imides) can be formed by esterification of diols with carboxylic acid-containing monomers with imide groups, as described in U.S. Pat. No. 4,383,105.

Crosslinking of the polymer can be determined by a variety of methods. In one embodiment, the gel fraction of polymer may be determined by using an equilibrium swelling method, comparing the weight of a dried film before and after crosslinking. In one embodiment, a crosslinked polymer can have a gel fraction in the range of from about 20 to about 100%, or from about 40 to about 100%, or from about 50 to about 100%, or from about 70 to about 100%, or from about 85 to about 100%. In one embodiment, the crosslinked network can be identified using rheological methods. An oscillatory time sweep measurement at specific strain, frequency, and temperature can be used to confirm the formation of crosslinked network. Initially, the loss modulus (G') value is higher than the storage modulus (G') value, indicating that the polymer solution behaves like a viscous liquid. Over time, the formation of a crosslinked polymer network is evidenced by the crossover of G' and G" curves. The crossover, referred to as the "gel point", represents when the elastic component predominates over the viscous.

The casting solution can further comprise any one of a number of additives, such as processing aids (e.g., oligomers), antioxidants, light stabilizers, flame retardant additives, anti-static agents, heat stabilizers, ultraviolet absorbing agents, inorganic fillers or various reinforcing agents. Inorganic fillers can include thermally conductive fillers, metal oxides, inorganic nitrides and metal carbides, and electrically conductive fillers like metals. Common inorganic fillers are alumina, silica, diamond, clay, talc, sepiolite, boron nitride, aluminum nitride, titanium dioxide, dicalcium phosphate, and fumed metal oxides. Low color organic fillers, such as polydialkylfluorenes, can also be used. Common organic fillers include polyaniline, polythiophene, polypyrrole, polyphenylenevinylene, polydialkylfluorenes, carbon black, graphite, multiwalled and single walled carbon nanotubes and carbon nanofibers. In one embodiment, nanoparticle fillers and nanoparticle colloids can be used.

In one embodiment, an electrically conductive filler is carbon black. In one embodiment, the electrically conductive filler is selected from the group consisting of acetylene blacks, super abrasion furnace blacks, conductive furnace blacks, conductive channel type blacks, carbon nanotubes, carbon fibers, fine thermal blacks and mixtures thereof. As described above for low conductivity carbon black, oxygen complexes on the surface of the carbon particles act as an electrically insulating layer. Thus, low volatility content is generally desired for high conductivity. However, it is also necessary to consider the difficulty of dispersing the carbon black. Surface oxidation enhances deagglomeration and dispersion of carbon black. In some embodiments, when the electrically conductive filler is carbon black, the carbon black has a volatile content less than or equal to 1%.

Fillers can have a size of less than 550 nm in at least one dimension. In other embodiments, the filler can have a size of less than 500, less than 450, less than 400, less than 350, less than 300, less than 250, or less than 200 nm (since fillers can have a variety of shapes in any dimension and since filler shape can vary along any dimension, the "at least one dimension" is intended to be a numerical average along that dimension). The average aspect ratio of the filler can be 1 or greater. In some embodiments, the sub-micron filler is selected from a group consisting of needle-like fillers (acicular), fibrous fillers, platelet fillers, polymer fibers, and mixtures thereof. In one embodiment, the sub-micron filler is substantially non-aggregated. The sub-micron filler can be hollow, porous, or solid. In one embodiment, the sub-micron fillers of the present disclosure exhibit an aspect ratio of at least 1, at least 2, at least 4, at least 6, at least 8, at least 10, at least 12, or at least 15 to 1.

In some embodiments, sub-micron fillers are 100 nm in size or less. In some embodiments, the fillers are spherical or oblong in shape and are nanoparticles. In one embodiment, sub-micron fillers can include inorganic oxides, such as oxides of silicon, aluminum and titanium, hollow (porous) silicon oxide, antimony oxide, zirconium oxide, indium tin oxide, antimony tin oxide, mixed titanium/tin/zirconium oxides, and binary, ternary, quaternary and higher order composite oxides of one or more cations selected from silicon, titanium, aluminum, antimony, zirconium, indium, tin, zinc, niobium and tantalum. In one embodiment, nanoparticle composites (e.g. single or multiple core/shell structures) can be used, in which one oxide encapsulates another oxide in one particle.

In one embodiment, sub-micron fillers can include other ceramic compounds, such as boron nitride, aluminum nitride, ternary or higher order compounds containing boron, aluminum and nitrogen, gallium nitride, silicon nitride, aluminum nitride, zinc selenide, zinc sulfide, zinc telluride, silicon carbide, and their combinations, or higher order compounds containing multiple cations and multiple anions.

In one embodiment, solid silicon oxide nanoparticles can be produced from sols of silicon oxides (e.g., colloidal dispersions of solid silicon oxide nanoparticles in liquid media), especially sols of amorphous, semi-crystalline, and/or crystalline silica. Such sols can be prepared by a variety of techniques and in a variety of forms, which include hydrosols (i.e., where water serves as the liquid medium), organosols (i.e., where organic liquids serves as the liquid medium), and mixed sols (i.e., where the liquid medium comprises both water and an organic liquid). See, e.g., descriptions of the techniques and forms disclosed in U.S. Pat. Nos. 2,801,185, 4,522,958 and 5,648,407. In one embodiment, the nanoparticle is suspended in a polar, aprotic solvent, such as, DMAc or other solvent compatible with polyamic acid or poly(amide amic acid). In another embodiment, solid nanosilica particles can be commercially obtained as colloidal dispersions or sols dispersed in polar aprotic solvents, such as for example DMAC-ST (Nissan Chemical America Corporation, Houston TX), a solid silica colloid in dimethylacetamide containing less than 0.5 percent water, with 20-21 wt % SiO2, with a median nanosilica particle diameter, $d_{50}$, of about 16 nm.

In one embodiment, sub-micron fillers can be porous and can have pores of any shape. One example is where the pore comprises a void of lower density and low refractive index (e.g., a void-containing air) formed within a shell of an oxide such as silicon oxide, i.e., a hollow silicon oxide nanoparticle. The thickness of the sub-micron fillers shell affects the strength of the sub-micron fillers. As the hollow silicon oxide particle is rendered to have reduced refractive index and increased porosity, the thickness of the shell decreases resulting in a decrease in the strength (i.e., fracture resistance) of the sub-micron fillers. Methods for producing such hollow silicon oxide nanoparticles are known, for example, as described in Japanese Patent Nos. 4406921B2 and 4031624B2. Hollow silicon oxide nanoparticles can be obtained from JGC Catalysts and Chemicals, LTD, Japan.

In one embodiment, sub-micron fillers can be coated with a coupling agent. For example, a nanoparticle can be coated with an aminosilane, phenylsilane, acrylic or methacrylic coupling agents derived from the corresponding alkoxysilanes. Trimethylsilyl surface capping agents can be introduced to the nanoparticle surface by reaction of the sub-micron fillers with hexamethyldisilazane. In one embodiment, sub-micron fillers can be coated with a dispersant. In one embodiment, sub-micron fillers can be coated with a combination of a coupling agent and a dispersant. Alternatively, the coupling agent, dispersant or a combination thereof can be incorporated directly into the polymer film and not necessarily coated onto the sub-micron fillers.

In some embodiments a coextrusion process can used to form a multilayer polymer film with an inner core layer sandwiched between two outer layers. In this process, a finished polyamic acid solution is filtered and pumped to a slot die, where the flow is divided in such a manner as to form the first outer layer and the second outer layer of a three-layer coextruded film. In some embodiments, a second stream of polyimide is filtered, then pumped to a casting die, in such a manner as to form the middle polyimide core layer of a three-layer coextruded film. The flow rates of the solutions can be adjusted to achieve the desired layer thickness.

In some embodiments, the multilayer film is prepared by simultaneously extruding the first outer layer, the core layer and the second outer layer. In some embodiments, the layers are extruded through a single or multi-cavity extrusion die. In another embodiment, the multilayer film is produced using a single-cavity die. If a single-cavity die is used, the laminar flow of the streams should be of high enough viscosity to prevent comingling of the streams and to provide even layering. In some embodiments, the multilayer film is prepared by casting from the slot die onto a moving stainless-steel belt. In one embodiment, the belt is then passed through a convective oven, to evaporate solvent and partially imidize the polymer, to produce a "green" film. The green film can be stripped off the casting belt and wound up. The green film can then be passed through a tenter oven to produce a fully cured polyimide film. In some embodiments, during tentering, shrinkage can be minimized by constraining the film along the edges (i.e., using clips or pins).

The thickness of the polymer film may be adjusted, depending on the intended purpose of the film or final application specifications. In one embodiment, the polyimide film has a total thickness in a range of from about 10 to about 80 µm, or from about 10 to about 25 µm, or from about 15 to about 25 µm.

In one embodiment, the polymer film has a b* of less than about 1.25, or less than about 1.0 or less than about 0.8 for a film thickness of about 25 µm, when measured with a dual-beam spectrophotometer, using D65 illumination and 10-degree observer, in total transmission mode over a wavelength range of 360 to 780 nm. In one embodiment, the polymer film has a yellowness index (YI) of less than about 2.25, or less than about 2.0 or less than about 1.75 for a film thickness of about 25 µm, when measured using the procedure described by ASTM E313.

Inorganic Substrates

In one embodiment, inorganic substrates can be inorganic materials containing silicon and oxygen. Inorganic substrates can be crystalline inorganic materials or amorphous. Substrates can be films or layers, or other shapes (e.g., wedges, prisms), including any angular or curved geometric shape. Substrates can be rods, cylinders or plates. Autoclave lamination process can be especially suited to bonding non-planar materials to non-planar substrates. In one embodiment, inorganic substrates can include ceramic, glass or glass-ceramic materials, or mixtures thereof.

In one embodiment, ceramic substrates containing silicon and oxygen can include oxides, nitrides or oxy-nitrides, phosphides or oxyphosphides, carbides or oxycarbides. In some cases, the substrate may comprise a silicon oxide surface but have a different bulk composition away from the surface of the substrate. For instance, a $Si_3N_4$ or a SiC substrate can be hydrolyzed or oxidized so that it contains silicon and oxygen at the surface. Multilayer inorganic substrates can also be used. Coatings of silicon oxide or silicon- and oxygen-containing inorganic species can be used on inorganic substrates. Coatings can be formed in a variety of ways, including physical vapor deposition, sputtering, atomic layer deposition and the like. Coatings can also be made, which contain silicon and oxygen, by liquid-based coating processes (spray coating, slot die coating, bar coating), for instance using an alkoxysilane as one component in the coating. The surface on the inorganic substrate does not have to have exclusively silicon and oxygen. A mixed phase or combination of phases can be used, as long as the surface includes silicon and oxygen.

In one embodiment, inorganic substrates can be glass substrates of various shapes and geometries. The term "glass" as used herein is meant to include any material made at least partially of glass, including glass and glass-ceramics. "Glass-ceramics" include materials produced through controlled crystallization of glass. In some embodiments, glass-ceramics have about 30% to about 90% crystallinity. Non-limiting examples of glass-ceramic systems that may be used include $Li_2O \times Al_2O_3 \times nSiO_2$ (i.e., LAS systems), $MgO \times Al_2O_3 \times nSiO_2$ (i.e., MAS systems), and $ZnO \times Al_2O_3 \times nSiO_2$ (i.e., ZAS systems).

In one or more embodiments, the inorganic substrate may include glass, which may be strengthened or non-strengthened. Examples of suitable glass include soda lime glass, alkali aluminosilicate glass, alkali-containing borosilicate glass and alkali aluminoborosilicate glass. In some variants, the glass may be free of lithia. In one or more alternative embodiments, the substrate may include crystalline substrates such as glass-ceramic substrates (which may be strengthened or non-strengthened) or may include a single crystal structure, such as sapphire. In one or more specific embodiments, the substrate includes an amorphous base (e.g., glass) and a crystalline cladding (e.g., sapphire layer, a polycrystalline alumina layer and/or a spinel ($MgAl_2O_4$) layer.

A substrate or layer may be strengthened to form a strengthened substrate or layer. As used herein, the terms "strengthened substrate" or "strengthened layer" may refer to a substrate and/or layer that has been chemically strengthened, for example through ion-exchange of larger ions for smaller ions in the surface of the substrate and/or layer. Other strengthening methods known in the art, such as thermal tempering, or utilizing a mismatch of the coefficient of thermal expansion between portions of the substrate and/or layer to create compressive stress and central tension regions, may also be utilized to form strengthened substrates and/or layers.

Where the substrate and/or layer is chemically strengthened by an ion exchange process, the ions in the surface layer of the substrate and/or layer are replaced by, or exchanged with, larger ions having the same valence or oxidation state. Ion exchange processes are typically carried out by immersing a substrate and/or layer in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate and/or layer in a salt bath (or baths), use of multiple salt baths, additional steps such as annealing, washing, and the like, are generally determined by the composition of the substrate and/or layer and the desired compressive stress (CS), depth of compressive stress layer (or depth of layer) of the substrate that result from the strengthening operation. By way of example, ion exchange of alkali metal-containing glass substrates and/or layers may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates and/or layers are immersed in multiple ion exchange baths, with washing and/or annealing steps between immersions, are described in U.S. Pat. No. 8,561,429, in which glass substrates are strengthened by immersion in multiple, successive, ion exchange treatments in salt baths of different concentrations; and U.S. Pat. No. 8,312,739, in which glass substrates are strengthened by ion exchange in a first bath that is diluted with an effluent ion, followed by immersion in a second bath having a smaller concentration of the effluent ion than the first bath.

In one embodiment, a solution having amine reagent containing silicon is used to treat an inorganic substrate using a dip coating process. The amine reagent containing silicon can have alkoxide groups. The amine reagent includes a primary or secondary amine, and after drying, the inorganic substrate has an amine-functional surface. Subsequently, the substrate can be laminated with heat and pressure to a polymer film, which includes a polymer having an imide group. The amine on the inorganic surface may react with the polymer to form an amide and provide siloxane linkages to the substrate.

Curable Resin Coating Compositions

In one embodiment, a curable resin coating composition can be applied to a polymer film layer. In some embodiments, a curable resin coating composition can be applied to an article including a polymer film layer and an inorganic substrate, wherein the curable resin coating composition is applied to a surface of the polymer film layer on a side opposite the inorganic substrate. In one embodiment, a curable resin coating composition comprises at least one curable oligomer and at least one organic coating solvent. Suitable curable oligomers are any which form a hard coat layer upon curing. As used herein, the term "hard coat" refers to a material, coating, or layer on a substrate that forms a film upon curing having a higher pencil hardness than the substrate. Such hard coat layers protect the underlying substrate from mechanical abrasion and wear, and optionally enhances the self-cleaning properties of the surface.

Suitable curable oligomers useful in a curable resin coating composition include, but are not limited to, (meth)acrylate oligomers, urethane oligomers, (meth)acrylate-urethane oligomers, siloxane oligomers, and combinations thereof. Liquid curable oligomers are preferred. Suitable (meth)acrylate oligomers include, without limitation, oligomers comprising as polymerized units one or more (meth)acrylate monomers chosen from an aliphatic monofunctional (meth)acrylate monomers and aliphatic multifunctional (meth)acrylate monomers. It is preferred that the present curable oligomer is chosen from (meth)acrylate oligomers, (meth)acrylate-urethane oligomers, siloxane oligomers, and combinations thereof, more preferably from (meth)acrylate-urethane oligomers and a siloxane oligomer.

In some embodiments, the curable resin coating compositions may comprise a cured acrylate resin material derived from an actinic radiation curable acrylic composition. The actinic radiation curable acrylic composition can comprise (a) one or more, or two or more, or all three multifunctional (meth)acrylate diluents chosen from (a1) an aliphatic trifunctional (meth)acrylate, preferably, acrylate, monomer, (a2) an aliphatic tetrafunctional (meth)acrylate monomer, or (a3) an aliphatic pentafunctional (meth)acrylate preferably, acrylate, monomer; (b) from 3 to 30, or from 10 to 30 wt %, based on the total weight of monomer solids, of one or more one (meth)acrylate, preferably, acrylate, monomer containing an isocyanurate group; (c) from 5 to 60, from 5 to 55, from 10 to 50, from 5 to 40, or from 10 to 40 wt % based on the total weight of monomer solids, of one or more aliphatic urethane (meth)acrylate, preferably, acrylate, functional oligomer having no fewer than 6 and up to 24, or from 6 to 12, or from 6 to 10 (meth)acrylate, preferably, acrylate, groups; (d) from 2 to 10, from 3 to 8, or from 3 to 7 wt % based on total monomer solids, of one or more radical initiators, wherein the total amount of monomer and functional oligomer solids amounts to 100 wt %. The actinic radiation curable acrylic composition can further comprise (e) one or more organic solvents.

In some embodiments, the actinic radiation curable acrylic composition can comprise from 9 to 70, from 9 to 60, from 3 to 30, from 3 to 20, or from 3 to 15 wt % of (a) one or more, or two or more, or all three multifunctional (meth)acrylate diluents chosen from (a1) an aliphatic trifunctional (meth)acrylate, preferably, acrylate, monomer (a2) an aliphatic tetrafunctional (meth)acrylate monomer; or (a3) an aliphatic pentafunctional (meth)acrylate.

The radical initiators can include, but are not limited to, benzophenones, benzils (1,2-diketones), thioxanthones, (2-benzyl-2-dimethylamino-1-[4-(4-morpholinyl)phenyl]-1-butanone), 2,4,6-trimethyl-benzoyl)-diphenyl phosphine oxide, 1-hydroxy-cyclohexyl-phenyl-ketone, 2-hydroxy-2-methyl-1-phenyl-1-propanone), oligomeric 2-hydroxy-2-methyl-1-[4-(1-methylvinyl)phenyl]propanones, dihydro-5-(2-hydroxy-2-methyl-1-oxopropyl)-1,1,3-trimethyl-3-(4-(2-hydroxy-2-methyl-1-oxopropyl)phenyl)-1H-indenes, and bis-benzophenones, or, preferably, oligomeric 2-hydroxy-2-methyl-1-[4-(1-methylvinyl)phenyl]propanones, dihydro-5-(2-hydroxy-2-methyl-1-oxopropyl)-1,1,3-trimethyl-3-(4-(2-hydroxy-2-methyl-1-oxopropyl)phenyl)-1H-indenes, or α-[(4-benzoylphenoxy)-acetyl]-w-[[2-(4-benzoylphenoxy)-acetyl]oxy]-poly(oxy-1,4-butanediyl)). The actinic radiation curable acrylic compositions of the present application further comprises from 0.1 to 30, from 1 to 30, from 2 to 30, from 3 to 30, from 10 to 30, from 3 to 25, from 5 to 25, or from 3 to 20 wt % based on the total weight of (a), (b), (c) and (d), of one or more thiol compounds of sulfur-containing polyol (meth)acrylates, or thiols not containing (meth)acrylate. Such compounds can be used to promote the surface cure of the actinic radiation cured coatings made from the present compositions. Suitable sulfur-containing polyol (meth)acrylates have at least 2, or at least 3, or 6 or fewer, or 5 or fewer, or from 2 to 6, (meth)acrylate functional groups. An exemplary sulfur-containing polyol (meth)acrylates can be a mercapto modified polyester acrylate, sold as EBECRYL™ LED 02 or LED 01 (Allnex Coating Resins, Germany).

The actinic radiation curable acrylic composition comprises in total 5 wt % or less, or 3.5 wt % or less, as solids, of inorganic nanoparticle compounds, such as fillers, for example silica, alumina, ceria, titania, zirconia or any suitable metal or metal oxide nanoparticles having an average particle size of 1000 nm or less in diameter for the primary particle size, or 500 nm or less, or 100 nm or less at the longest dimension, measured by Brunauer-Emmett-Teller analyzer. The nanoparticles can be symmetric, such as sphere, or non-symmetric, such as rod. They can be solid or hollow, or mesoporous. The nanoparticles may be individually dispersed or can be dispersed as aggregates in the composition. When the nanoparticles used are agglomerates, they have a secondary average particle size of less than 10000 nm, as measured by dynamic laser light scattering.

In one embodiment, the actinic radiation curable acrylic composition comprises (a) a multifunctional (meth)acrylate diluent of the (a1) one or more aliphatic trifunctional (meth)acrylate, preferably, acrylate, monomer, in the amount of from 3 to 25, from 3 to 20, or from 3 to 15 wt %, based on total monomer solids, wherein the total amount of monomer and functional oligomer solids amounts to 100%.

In another embodiment, the actinic radiation curable acrylic composition comprises (a) a multifunctional (meth)acrylate diluent of the (a2) one or more aliphatic tetrafunctional (meth)acrylate, preferably, acrylate, monomer, in the amount of from 3 to 25, from 3 to 20, or from 3 to 15 wt %, based on total monomer solids, wherein the total amount of monomer and functional oligomer solids amounts to 100%.

In yet another embodiment, the actinic radiation curable acrylic composition comprises (a) a multifunctional (meth)acrylate diluent of the (a3) one or more aliphatic pentafunctional (meth)acrylate, preferably, acrylate, monomer, in the amount of from 3 to 25, from 3 to 20, or from 3 to 15 wt %, based on total monomer solids, wherein the total amount of monomer and functional oligomer solids amounts to 100%.

In some embodiments, the actinic radiation curable acrylic composition comprises at least one (c) aliphatic urethane (meth)acrylate functional oligomer has a formula molecular weight of from 1400 to 10000, or from 1500 to 6000 g/mol, wherein the reacted isocyanate (carbamate) content of the composition, as solids, of the one or more (c) aliphatic urethane (meth)acrylate, preferably, acrylate, functional oligomer ranges from 5 to 60, or from 10 to 50 wt %.

In some embodiments, the curable resin coating compositions may comprise siloxane oligomers. Suitable siloxane oligomers are those disclosed in U.S. Patent Application Publication Nos. 2015/0159044 and 2017/0369654, and in U.S. Pat. Nos. 7,790,347 and 6,391,999. In one embodiment, preferred curable oligomers comprise polymerized units of formula $R1_mR2_nSi(OR3)_{4-m-n}$, wherein: R1 is a C5-20 aliphatic group comprising an oxirane ring fused to an alicyclic ring; R2 is a C1-20 alkyl, C6-30 aryl group, or C5-20 aliphatic group having one or more heteroatoms; R3 is a C1-4 alkyl group or C1-4 acyl group; m is 0.1 to 2.0; and n is 0 to 2.0. When the siloxane oligomer contains siloxane units which are not identical, m and n are molar average values. It is preferred that R1 contains at least 6 carbon atoms, preferably no more than 15, preferably no more than 12, preferably no more than 10. Preferably, R1 comprises an oxirane ring fused to an alicyclic ring having 5 or 6 carbon atoms, preferably six carbon atoms, and more preferably a cyclohexane ring. Preferably, R1 contains no elements other than carbon, hydrogen and oxygen. It is preferred that R1 is an epoxycyclohexyl (that is, a cyclohexene oxide) group linked to silicon by a —$(CH_2)_j$— group, where j is from 1 to 6, and preferably 1 to 4. Preferably, when R2 is alkyl it contains no more than 15 carbon atoms, more preferably no more than 12, and yet preferably no more than 10. When R2 is an aryl group it preferably contains no more than 25 carbon atoms, more preferably no more than 20, and yet preferably no more than 16. The term "C5-20 aliphatic group having one or more heteroatoms" refers to a C5-20 aliphatic group having one or more of: a halogen such as fluorine; an ester group such as an acrylate group, a methacrylate group, a fumarate group, or a maleate group; a urethane group; and a vinyl ether group. It is preferred that R2 is a C1-20 alkyl or C6-30 aryl group, and more preferably C1-20 alkyl. In an alternate preferred embodiment, R2 is a C1-20 alkyl or a C5-20 aliphatic group having one or more heteroatoms, and more preferably C1-20 alkyl. Preferably, when R3 is alkyl, it is methyl or ethyl, and more preferably methyl. When R3 is acyl, it is preferably formyl or acetyl. Preferably, m is at least 0.2, and more preferably at least 0.5; preferably no greater than 1.75, and more preferably no greater than 1.5. Preferably, n is no greater than 1.5, more preferably no greater than 1.0, yet preferably no greater than 0.8, and even more preferably n is zero. Suitable curable siloxane oligomers are available from Polyset Company (Mechanicville, NY).

Typically, the one or more curable oligomers are present in the curable resin coating composition in an amount of from 25 to 99 wt %, based on the total weight of the composition excluding organic solvent. Preferably, the curable resin coating composition comprises a siloxane oligomer in an amount of at least 28 wt %, preferably at least 29 wt %, preferably at least 30 wt %; preferably no more than 99 wt %, and preferably no more than 65 wt %, based on the total weight of the composition excluding organic solvent. When the curable oligomer is a siloxane, it is preferred that the siloxane oligomer comprises from 25 to 80 wt %, more preferably from 30 to 70 wt %, based on the total weight of the composition excluding organic solvent. Preferably, the present curable resin coating compositions comprise from 50.1 to 100 wt % of the organic coating solvent described above and from 0 to 49.9 wt % of one or more secondary organic solvents, based on the total weight of organic solvent. When one or more secondary organic solvents are used, they are preferably present in an amount of from 1 to 49.5 wt %, preferably from 2 to 40 wt %, and more preferably from 5 to 20 wt %, based on the total weight of organic solvents.

In one embodiment, reactive modifiers may be added to the curable resin coating composition to modify the formulation for performance improvement. Such reactive modifiers include, without limitation, flexibility modifiers, hardness modifiers, viscosity modifiers, optical property modifiers, and the like. Preferably, the reactive modifiers are present in the resin composition in a total amount from 0 to 20 wt %; preferably at least 1 wt %, preferably at least 4 wt %, preferably at least 8 wt %; preferably no more than 17 wt %, and preferably no more than 15 wt %, based on the total weight of components in the composition exclusive of organic solvent. Preferably, the reactive modifier comprises at least two epoxycyclohexane groups or at least two oxetane rings, and more preferably two epoxycyclohexane groups.

In one embodiment, one or more commonly known other additives may be added to the curable resin coating composition to further modify properties of the cured coating. Such optional additives include, without limitation, adhesion-promoters, leveling agents, defoaming agents, antistatic agents, anti-blocking agents, UV absorbers, optical whitening agents, anti-fingerprint additives, scratch resistance additives, and the like. Mixtures of two or more of such optional additives may be used in the compositions. These additives may be in liquid or solid form. Typically, each additive may be used in an amount of 0 to 5 wt %, and preferably from 0.1 to 5 wt %, and more preferably from 1 to 3 wt %, based on the total weight of the composition. Scratch resistance additives may be used in an amount of from ≤5 wt %, preferably ≤3 wt %, and more preferably ≤1.5 wt %, based on the total weight of the composition. A suitable amount of such scratch resistance additives is from 0 to 5 wt %, preferably from 0.1 to 3 wt %, and more preferably from 0.1 to 1.5 wt %, based on the total weight of the composition. Scratch resistance additives may contain small amounts of inorganic particles.

In one embodiment, curable resin coating compositions optionally contain a curing agent, such as a photocuring agent, a thermal curing agent, or a combination thereof. Preferably, the curable resin coating composition comprises a photocuring agent, and more preferably a cationic photoinitiator. Such curing agent is present in the curable resin coating compositions in an amount of from 0 to 8 wt %, based on the total weight of the composition excluding organic solvent, and preferably from 0.5 to 7 wt %. Preferably, the curable resin coating composition comprises at least 1 wt % of the cationic photoinitiator, preferably at least 1.5 wt %; preferably no more than 6 wt %, preferably no more than 5 wt %, and preferably no more than 4.5 wt %. Preferred initiators include, e.g., diaryliodonium salts and triarylsulfonium salts. Such curing agents are well-known to those skilled in the art and are generally commercially available from a variety of sources. Optionally, a photosensitizer may be used in combination with a photocuring agent. Any suitable photosensitizer known in the art may be used. The selection of which photosensitizer and the amount thereof to be used is within the ability of those skilled in the art.

In one embodiment, nanoparticles may optionally be, and preferably are, added to the present curable resin coating compositions. Suitable nanoparticles are inorganic nanoparticles and organic nanoparticles. When inorganic particles are used in the present curable resin coating compositions, they are used in an amount of from 35 to 66 wt %, based on the total weight of the composition excluding organic solvent. Preferably, the curable resin coating composition comprises at least 40 wt % non-porous nanoparticles of silica, a metal oxide, or a mixture thereof, preferably at least 42 wt %; preferably no more than 65 wt %, preferably no more than 64 wt %, preferably no more than 63 wt %. The organic nanoparticles may be present in the curable composition in an amount ranging from 0 to 10 wt %, preferably in an amount of at least 0.1 wt %, preferably in an amount of up to 6 wt %, based on the total weight of the resin composition excluding any organic solvent. Preferably, the organic nanoparticle is present in the curable resin coating composition in an amount of from 0.1 to 10 wt %, and more preferably from 0.1 to 6 wt %, based on the total weight of the composition excluding any organic solvent. Suitable inorganic nanoparticles are non-porous nanoparticles chosen from silica, metal oxide, or a mixture thereof. Preferably, the non-porous nanoparticles are silica, zirconium oxide, or a mixture thereof, and preferably silica. Preferably, the surface area of the non-porous nanoparticles is at least 50 $m^2/g$, preferably at least 60 $m^2/g$; preferably no greater than 500 $m^2/g$, preferably no greater than 400 $m^2/g$. In general, the non-porous nanoparticles of silica, a metal oxide, or a mixture thereof, the non-porous nanoparticles having an average particle diameter from 5 to 50 nm. Preferably, the average diameter of the nanoparticles is at least 10 nm, preferably at least 15 nm; preferably no greater than 40 nm, preferably no greater than 35 nm. Preferably, the non-porous nanoparticles are functionalized with substituent groups that can react with the epoxy group of epoxy-siloxane oligomer under a cationic photo curing process or thermal curing condition. Preferred substituent groups include, e.g., epoxy, acrylate, amino, vinyl ether, etc. Suitable organic nanoparticles include, without limitation, core-shell rubber (CSR) nanoparticles. The optional CSR organic nanoparticles comprise a rubber particle core and a shell layer, such CSR particles having an average diameter of from 50 to 250 nm. The shell layer of the CSR nanoparticles provides compatibility with the curable resin coating composition and has limited swellability to facilitate mixing and dispersion of the CSR nanoparticles in the curable resin coating composition. Suitable CSR nanoparticles are commercially available, such as those available under the following tradenames: Paraloid EXL 2650 A, EXL 2655, EXL2691 A, available from The Dow Chemical Company, or Kane Ace® MX series from Kaneka Corporation, such as MX 120, MX 125, MX 130, MX 136, MX 551, or METABLEN SX-006 available from Mitsubishi Rayon, or Genioperl P52 from Wacker Chemie AG.

In one embodiment, curable resin coating compositions comprise an organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; methyl 2-hydroxy-2-methylpropanoate; isopropyl acetate; isoamyl acetate; and mixtures thereof, preferably comprise an organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; methyl 2-hydroxy-2-methylpropanoate; isoamyl acetate; and mixtures thereof, and more preferably comprise an organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; and methyl 2-hydroxy-2-methylpropanoate; and mixtures thereof.

In one embodiment, curable resin coating compositions may comprise one or more secondary organic solvents in addition to the one or more organic coating solvents described above. The one or more secondary organic solvents are different from the one or more organic coating solvents. A wide variety of organic solvents may be used as the secondary organic solvent in the present compositions, provided that the organic coating solvent is in the majority (>50 wt % of the solvent mixture) and the secondary organic solvent is in the minority (<50 wt % of the solvent mixture). Suitable secondary organic solvents have from 3 to 10 carbon atoms, and may be aliphatic or aromatic. Preferably, the secondary organic solvent is aliphatic and more preferably a C3-10 aliphatic compound having one or more oxygen atoms. Exemplary secondary organic solvents include, but are not limited to: 1-methoxypropan-2-ol (PGME); 1-ethoxypropan-2-ol (PGEE); 1-methoxy-2-methylpropan-2-ol; methyl lactate; ethyl lactate; methyl glycolate; 1-methoxy-propan-2-one; hydroxyacetone; 1,2-dimethoxyethane; 1,2-dimethoxypropane; 1-methoxy-2-butanol; methyl 2-methoxyacetate; isopropanol; cyclopentanol; 2-methylbutan-1-ol; 4-methylpentan-2-ol; 3-methylbutan-2-ol; toluene; and mixtures thereof.

In one embodiment, curable resin coating formulations can be prepared by first combining the desired amount of resin with the desired amount of nanoparticle suspension in a 20-ml scintillation vial, followed by sonication (Fisher Scientific bath sonicator) and vortex mixing at room temperature until a homogenous mixture is obtained. When a nanoparticle suspension is used, it is used as received or the suspension is concentrated under vacuum at room temperature until ca. 95% of the solvent had been removed as judged by loss in sample weight. New solvent is then added as specified, and the mixture homogenized under sonication and vortex mixing. Lastly, the desired amount of photoacid generator (PAG) is added into the solution. The final formulation is left on a rotary mixer for at least 12 hours at room temperature to ensure homogenous mixing before film casting.

Suitable methods for coating the curable resin coating composition include, but are not limited to, spin-coating, curtain coating, spray coating, roller coating, doctor blading, bar coating, dip coating, slot die coating, and vapor deposition, among other methods. After casting, the coating is baked to remove the organic coating solvent and any optional secondary organic solvent. The selection of such baking conditions is within the ability of those skilled in the art. Next, the coating is cured, such as by heating or by exposure to actinic radiation (photocuring), and preferably by exposure to UV radiation, to form a hard coat film on the surface of the polymer film. In one embodiment, draw-down bars (manually or machine-operated) with different gap sizes are used to control film thickness of the hard coating when casting the prepared formulations on polymer films. The cast film is immediately heated to 90° C. on a hotplate for three minutes in a fume hood, followed by UV-curing (Fusion D-type bulb, four passes at a belt speed of 47 fpm). The average values for UV irradiance are around 3670, 960, 280, 4360 mW/cm² in the UVA, UVB, UVC, and UW regimes, respectively. The average values for energy density were ca. 480, 120, 40, and 570 mJ/cm² in the UVA, UVB, UVC, and UW regimes, respectively. Finally, the films are thermally cured for 2 hours at 87° C. in an oven after UV-cure. In one embodiment, after curing, the adhesion-promoter at the interface between the hard coat film and the polyimide film can be partially or substantially intermixed with the hard coat film.

Lamination

The adhesion of the polymer film to the inorganic substrate can be accomplished by heating while applying pressure in a hydraulic press. In some embodiments, the polymer film has a hard coat layer present on one surface of the polymer film layer prior to lamination, and the inorganic substrate is adhered to the opposite surface of the polymer film layer. Typically, the highest temperature achieved during the lamination process is not less than 20° C. below the $T_g$ of the polymer film layer. Higher temperatures can be used for the lamination, but at temperatures greater than 50° C. above the $T_g$ of the polymer, some discoloration of the film can occur if the residence time at the higher temperature is five minutes or more. Hence, higher temperature lamination may require residence times shorter than 5 minutes. Lamination in the hydraulic press can be in air or under vacuum to help remove trapped air. The amine reagent can be applied to the inorganic substrate surface, the polymer film surface, or both surfaces. Any method to contact the inorganic substrate or polymer film with a soluble amine reagent can be used, including bar coating, slot die coating, spray coating, dip coating, spin coating or other liquid coating methods. In one embodiment, a surface of the inorganic substrate, the polymer film layer, or both the inorganic substrate and the polymer film may be plasma treated or corona treated before lamination to further enhance the adhesion of the polymer film layer to the inorganic substrate. Any plasma or corona treatment will be performed before treatment with an amine reagent. In one embodiment, a surface of the inorganic substrate, the polymer film layer, or both the inorganic substrate and the polymer film may further include additional adhesion promoters that are not amine reagents as described above. In one embodiment, lamination is carried out at a temperature in a range of from about 20 degrees below to about 50 degrees above the $T_g$ of the polymer film layer.

In one embodiment, a polymer film layer can be adhered to an inorganic substrate using an autoclave lamination process. An autoclave is a high-temperature pressure vessel which can be used to produce laminate structures in a batch process. The laminate components are assembled prior to loading the pressure vessel chamber and are arranged in such a way that they do not move while under heat and pressure. The process generally operates using air or an inert gas such as argon or nitrogen to provide the pressure to laminate the materials inside the pressure vessel chamber. The gas inside is then heated and cooled through different cycles using a heat exchanger to maintain different temperature and pressure profiles for set periods of time. In one embodiment, process cycles will range from about 100 to about 400 psig and from about 100 to about 400° C. with total cycle time accumulating up to about 30 hours. After the cycles are complete and the chamber is returned to ambient temperature and pressure the contents are removed. In one embodiment, autoclave lamination is carried out at a temperature in a range of from about 20 degrees below to about 50 degrees above the $T_g$ of the polymer film layer.

In one embodiment, a roll-to-roll process may be used to form the laminate articles of the present invention. In such a process, the polymer film layer is supplied from a roll and first passes over a tension roll along with the inorganic substrate. Either one or both surfaces can be treated with the amine reagent.

In one embodiment, nip-roll lamination may be used, wherein nip rolls may be heated to promote bonding of the polymer film layer to the inorganic substrate. The bonding pressure exerted by the nip rolls may vary with the film materials, the polymeric materials, and the temperatures employed. Proper control of the speed and the tension will minimize wrinkling of the film. In one embodiment, the temperature of the nip rolls is in a range of from about 20 degrees below to about 50 degrees above the $T_g$ of the polymer film layer.

After bonding, the laminate is passed over a series of cooling rolls which ensure that the laminate taken up on a roll is not tacky. Process water cooling is generally sufficient to achieve this objective. Tension within the system may be further maintained using idler rolls. Laminate articles made through this process will have sufficient strength to allow for further handling by laminators that may add additional layers to the laminate.

Applications

In one embodiment, articles having inorganic substrates and polymer film layers, such as glass or ceramic laminates, can be used as impact-resistant laminates for structural, or architectural, applications, such as hurricane-resistant windows, theft-resistant panels and blast-resistant structures. For example, glass beams, composed of laminated glass, usually provide poor post-breakage robustness if all plies are broken. Articles that combine inorganic substrates with ductile polymer layers can improve the structural performance after failure and expand the scope of applications for these laminates. In one embodiment, structural laminates having inorganic substrates and polymer film layers can also be used as sound-reducing laminates, such as sound insulating panels.

In one embodiment, articles having inorganic substrates and polymer film layers can be used in applications for penetration-resistant laminates, such as bulletproof glass and armor. For example, bulletproof glass is a strong and optically transparent material that is particularly resistant to penetration by projectiles and can benefit from the less rigid properties of the polymer layer in a multilayer film. In one embodiment, a ceramic substrate, such as single-crystal sapphire, aluminum oxynitride or other oxynitrides and spinel ceramics, can be laminated to a polymer film layer and used as transparent armor. In some cases, these ceramic laminates can greatly reduce the weight of armor while providing the same penetration resistance as glass laminates.

In one embodiment, articles having inorganic substrates and polymer film layers can be used in architectural applications or transportation application where a combination of impact resistance, penetration resistance and sound reduction are desired. For example, a windshield on a vehicle may include one or more inorganic substrates and one or more polymer film layers that provide the windshield with a desired impact resistance, penetration resistance and sound insulation.

In one embodiment, articles having inorganic substrates and polymer film layers can be used as panels for electronic devices, such as displays for consumer electronic devices.

The advantageous properties of this invention can be observed by reference to the following examples that illustrate, but do not limit, the invention. All parts and percentages are by weight unless otherwise indicated.

EXAMPLES

Test Methods

Interlaminar Fracture Toughness in Mode I ($G_{Ic}$)

Interfacial bond strength was measured with a double-cantilever beam test using an ElectroForce® 1000 test instrument (TA Instruments, New Castle, DE) equipped with a 1000 lb load cell and a 1×6" laminate specimen. This specimen was adhered top and bottom with 1×6" aluminum backing bars to limit the sample deflection under load, and to attach to loading blocks. The result is a sandwich as follows: Al bar/Polymer Layer/Substrate/Al bar. Then, loading blocks were attached to the aluminum backing bars top and bottom. The test purposefully creates an initial crack between the weakest layers and propagates that crack along the interface while measuring the transverse load, the opening displacement, and the crack length along the specimen long axis.

Measurement of CIE L*, a*, b* Color

Color measurements were performed using a ColorQuest® XE dual-beam spectrophotometer (Hunter Associates Laboratory, Inc., Reston, VA), using D65 illumination and 10 degree observer, in total transmission mode over a wavelength range of 380 to 780 nm. Percent haze and transmittance were also measured using this instrument.

Yellowness Index

Yellowness Index (YI) was measured using the procedure described by ASTM E313.

Glass Transition Temperature

Glass transition temperature (Tg) was measured using dynamic mechanical analysis (Q800 DMA, TA Instrument) and is determined by the tan delta peak.

Thickness

Film thickness was determined by measuring 5 positions across the profile of the film using a contact-type FISCHERSCOPE MMS PC2 modular measurement system thickness gauge (Fisher Technology Inc., Windsor, CT).

Examples 1 to 3 and Comparative Example 1

For the polyamic acid solution (PAA) of Examples 1 to 3 (E1-E3) and Comparative Example 1 (CE1) with a monomer composition of 6FDA 1.0//TFMB 0.5/HMD 0.5 (molar equivalents), into a 500-ml reaction vessel, equipped with mechanical stirring and nitrogen purged atmosphere, 298.2 g anhydrous DMAc and 50.0 g of 4,4'-(hexafluoroisopropylidene)diphthalic anhydride (6FDA, Synasia Inc., Metuchen, NJ) was added. 18.02 g of trifluoromethylbenzidine (TFMB, Seika Corp., Wakayam Seika Kogyo Co., LTD., Japan) and 6.54 g of 1,6-diaminohexane (HMD, TCI America, Portland, OR) were added slowly over a period of 20 minutes. The reaction mixture was stirred and heated at 40° C. for 16 hours. The solution became slightly viscous. Films were prepared by doctor blade coating the polyamic-acid solution onto glass treated with a release agent. The polyamic-acid films were dried at 80° C. to form a film of approximately 70 to 80 wt % solids. The film was then cured in an oven from 150° C. to 300° C. over the course of 20 minutes.

For E3, the interlaminar fracture toughness in Mode I ($G_{Ic}$) was measured. In this example, the interfacial adhesion between polymer and substrate was greater than the fracture toughness of the substrate itself and resulted in fracture of the substrate. The calculated fracture energy in the test was 9.1 J/m².

Examples 4 to 10 and Comparative Examples 2 and 4

For Examples 4 to 10 (E4-E10) and Comparative Examples 2 and 4 (CE2 and CE4), the same procedure as described in E1 was used, but the monomer composition was 6FDA 1.0//TFMB 0.75/HMD 0.25.

Comparative Example 3

For Comparative Example 3 (CE3), to prepare a polyamic acid solution with a monomer composition of CBDA 0.6/6FDA 0.4//TFMB 1.0, into a 72-L nitrogen purged resin kettle, 2.268 kg of TFMB was added along with 35.191 kg DMAc (<300 ppm $H_2O$). 1.252 kg of 6FDA (Daikin America, Orangeburg, NY) and 0.829 kg of cyclobutane-1,2,3,4-tetracarboxylic dianhydride (cyclobutane dianhydride, CBDA, Wilshire Technologies, Princeton, NJ) were added in three aliquots over three 60-minute intervals. The reaction mixture was held at 40° C. during these additions. The polymer was polymerized ("finished") to ~13.2 poise using small additions of 6FDA powder.

To prepare a polymer solution, an additional 2.787 kg of DMAc was added and stirred for 60 minutes. 1.650 kg of beta-picoline and 1.808 kg of acetic anhydride were then combined with the polyamic acid solution in four aliquots over 2 hours. The reaction mixture was heated to 80° C. and then stirred for 2 hours before allowing to cool to room temperature.

From the polymer solution, a solid polymer resin was isolated. 9 kg of the polymer solution was diluted with 9 kg of acetone under nitrogen atmosphere. To this stirred solution was added 13.5 kg of methanol over a period of 3-4 hours; care was taken to avoid clumping or string formation of the polymer during the precipitation. The resulting mixture was allowed to break down, while stirring, and then treated with 6 kg of a hardening solution constituting of 25 wt % methanol in distilled water over 30 minutes. The resulting slurry was aged for 60 minutes and the solids recovered via filtration. The solids were subsequently washed three times with a 25 wt % methanol/water mixture and dried under vacuum. The process was similarly repeated twice. A total of 25.195 kg polymer solution was treated to yield approximately 2.164 kg (90%) of solid polymer resin.

To prepare a coating solution, a nitrogen blanketed 6-liter glass reactor fitted with a Teflon® coated stirrer and thermocouple was charged with DMAc (3401.33 g) and stirred. The polymer resin (500.91 g) was added and the suspension stirred at 150 rpm and heated to 50° C. for 8 hours then gradually cooled to 25° C. and allowed to stir for 21 hours to obtain a solution with a viscosity of 150.0 poise. The solution was diluted by small additions of DMAc until a final viscosity of 71.0 poise was obtained.

The polymer solution was loaded into a Nordson EFD cartridge, pressurized with nitrogen gas and pushed through a Whatman polypropylene filter capsule with an absolute retention of 0.45 µm (Part #2810T) prior to coating.

Example 11

For Example 11 (E11), a multilayer polyimide film was prepared, having an inner polyimide core layer and two thermoplastic polyimide outer layers formed by co-extrusion of the layers. Polyamic acid solutions for producing the core layer and outer layers were separately prepared by chemical reaction between the appropriate molar equivalents of the monomers in DMAc. For the core layer, the monomer composition in the polyamic acid solution was BPDA 0.95/PMDA 0.05//PPD 0.92/ODA 0.08. For the outer layers, the monomer composition in the polyamic acid solution was ODPA 0.8/PMDA 0.2//RODA 1.0. The diamines, dissolved in DMAc, were stirred under nitrogen, and the dianhydrides were added as a solid over a period of several minutes. Stirring was continued to obtain maximum viscosity of the polyamic acid. The viscosity was adjusted by controlling the amount of dianhydride in the polyamic acid composition.

Multilayer films were cast by co-extrusion. Three separate polyamic polymer streams were simultaneously extruded through a multi-cavity extrusion die onto a heated moving belt to form a co-extruded three-layer polyimide film. The thicknesses of the polyimide core layer and the top and bottom thermoplastic polyimide outer layers were adjusted by varying the amounts of polyamic acids fed to the extruder.

The extruded multilayer film was dried at an oven temperature in the range of from about 95 to about 150° C. The self-supporting film was peeled from the belt and heated with radiant heaters in a tenter oven at a temperature of 805° C. (radiant heater surface temperature) to completely dry and imidize the polymers.

For Comparative Examples 1 and 2 (CE1 and CE2), no silane treatment was performed on either the polymer film or the inorganic substrate.

For Examples 1 to 4 (E1-E4) and Comparative Example 3 (CE3), the inorganic substrates were treated in a silane solution in the following manner. To a solution of MeOH/deionized water (95/5 v/v, 200 ml) in a Pyrex® bottle was added 0.6 ml of 3-(2-aminoethylamino) propyltrimethoxysilane (AEAPTMS) to form a 0.3 vol % AEAPTMS solution. The solution was shaken several times and left to age overnight. 100×100×0.7 mm borosilicate glass substrates (Corning® EAGLE XG® Slim Glass, Corning Inc., Corning, NY) were rinsed with acetone then methanol and partially submerged in a glass container containing the silane solution. After 2 minutes of gentle agitation, the substrates were removed and rinsed with methanol, held end-wise on paper towels to allow excess solvent to wick away, and placed on a hotplate for 10 minutes at 110° C.

For Examples 5, 6 and 8 to 11 (E5, E6 and E8-E11), the glass substrates were treated in a silane solution in the following manner. MeOH was added to AEAPTMS to form a 1 wt % AEAPTMS solution, which was rolled for 1-2 hours. 177×304×1 mm borosilicate glass substrates (Corning® EAGLE XG® Slim Glass) were rinsed with acetone or isopropyl alcohol prior to the pretreatment. 5 ml of the silane was placed on the glass surface to be laminated on the polyimide using a syringe and spread uniformly using a squeegee. The samples were coated to allow release on one edge by leaving the surface clean and without pre-treatment. The surface was dried at room temperature for 10 minutes. Excess silane was removed from the surface using a 9:1 methanol:water solution.

For Comparative Example 4 (CE4), the glass treatment described above for E5 was followed, but replacing the AEAPTMS with phenyltrimethoxysilane.

For Examples 7 (E7), the glass treatment described above for E5 was followed, but the AEAPTMS was applied neat to the glass surface.

For Examples 1 to 6 (E1-E6) and Comparative Examples 1, 2 and 4 (CE1, CE2 and CE4), the polymer film on inorganic substrate was formed in the following manner. The polyimide film and glass were wiped with a polyester wipe (AlphaWipe® TX1009, Texwipe, Kemersville, NC) wet with isopropyl alcohol. A sandwich construction was assembled which included: metal plate (3 mm)/reinforced silicone rubber sheet (3 mm)/Fluorinated Ethylene Propylene (FEP) film (0.5 mm)/silane treated glass/polyimide film (35 µm)/FEP film (0.5 mm)/reinforced silicone rubber sheet (3 mm)/metal plate (3 mm). The sandwich was loaded into a 6" benchtop press (Auto C-PL, H, Carver, Inc., Wabash, IN) at a preset temperature and pressure and the platens were closed. The sample was heated for a predetermined time, removed from the press hot, and allowed to cool under ambient conditions. Table 1 lists the temperature, pressure and time for each sample. To test for adhesion, the untreated edge of each sample was used to manually pull apart the laminate. A "pass" indicates that the laminate was resistant to separation, while a "fail" indicates that the laminate readily pulled apart with little resistance.

For Comparative Example 3 (CE3), the polymer solution was coated onto the inorganic substrate using a model B-T Bars Precision Sheet Coater, which was equipped with a 6" wide×20 mil thick slot-shim. The air gap was set at 1.5 times the wet-coating thickness, and the coating speed was adjusted to maintain a pump flow rate of less than 6 m/min. The polyimide was coated onto borosilicate glass substrates (Corning® EAGLE XG® Slim Glass). After coating, the polymer film on inorganic substrate was soft-baked at progressively higher temperatures using a series of 6 hotplates (5 minutes at each temperature: 75, 80, 85, 90, 95, and 100° C.). The film was fully dried in a Carbolite model HTCR6/95 oven (Gero Hope, UK) under $N_2$ purge (2.7 SCFM). The heating profile consisted of a 5° C./minute ramp to 50° C. followed by a 20-minute hold, and a 5° C./minute ramp to 265° C. followed by a 60-minute hold. Following this heating profile, the film was removed from the oven and allowed to cool to room temperature in air. The film was removed from the support glass by prying the edge of the film with a razor blade.

For Examples 7 to 11 (E7-E11), the polymer film on inorganic substrate was formed in the following manner. The polyimide film and glass were wiped with isopropyl alcohol and a cloth and allowed to air dry. A sandwich construction was assembled which included: metal plate (14"×14")/reinforced silicone rubber sheet/metal plate/thick silicone rubber sheet/FEP film/polyimide film/borosilicate glass with silane/FEP film/reinforced silicone rubber sheet/metal plate/reinforced silicone rubber sheet/metal plate. The sandwich was loaded into a 15"×15" Wabash Press (Model GS30H-15-CX) and the platens were closed. The sample was heated for a predetermined time under vacuum, allowed to cool in the press, and removed from the press.

TABLE 1

| Example | Substrate Pretreatment | T (° C.) | $P_{max}$ (psig) | Total Time (minutes) | Adhesion |
|---|---|---|---|---|---|
| E1 | AEAPTMS | 240 | 243 | 10 | Pass |
| E2 | AEAPTMS | 240 | 243 | 30 | Pass |
| E3 | AEAPTMS | 286 | 302 | 30 | Pass |
| CE1 | none | 240 | 243 | — | Fail |
| E4 | AEAPTMS | 291 | 301 | 30 | Pass |
| CE2 | none | 292 | 301 | 30 | Fail |
| CE3 | AEAPTMS | 290 | 513 | 30 | Fail |
| E5 | AEAPTMS | 291 | 344 | 15 | Pass |
| CE4 | phenyl-trimethoxysilane | 291 | 301 | 30 | Fail |
| E6 | AEAPTMS | 290 | 367 | 15 | Pass |
| E7 | AEAPTMS | 251 | 290 | 140 | Pass |
| E8 | AEAPTMS | 251 | 290 | 140 | Pass |
| E9 | AEAPTMS | 251 | 290 | 140 | Pass |
| E10 | AEAPTMS | 232 | 290 | 130 | Pass |
| E11 | AEAPTMS | 232 | 290 | 130 | Pass |

TABLE 2

| Example | L* | a* | b* | YI E313 [D65/10] | Haze % [D65/10] | Thickness (μm) | Transmittance (380-780 nm) |
|---|---|---|---|---|---|---|---|
| E1 | 96.5 | −0.15 | 0.9 | 1.59 | 0.36 | 37.67 | 89.77 |
| E2 | 96.5 | −0.17 | 1 | 1.77 | 0.39 | 36.33 | 89.75 |
| E3 | 96.82 | −0.24 | 1.15 | 1.99 | 6.1 | 37 | 90.31 |
| CE1 | 94.65 | −0.13 | 0.94 | 1.72 | 0.61 | 44 | 83.35 |
| E4 | 96.51 | −0.2 | 1.19 | 2.1 | 12.29 | 33.67 | 89.64 |
| CE2 | 93.82 | −0.13 | 1.08 | 2 | 13.71 | 39.67 | 83.35 |
| CE4 | 96.5 | −0.15 | 0.9 | 1.59 | 0.36 | 37.67 | 89.77 |

Example 12

For Example 12 (E12) a borosilicate glass substrate (Corning® EAGLE XG® Slim Glass, 100×100×0.7 mm) was cut into 25.4×100×0.7 mm sections using a laboratory glass cutter. The glass pieces were rinsed with acetone and then methanol and dried using compressed dry air. The samples were individually placed in a Pyrex® bottle with the silane solution (1 wt % AEAPTMS in MeOH/H$_2$O, 95/5 v/v) and volume adjusted such that only one half of the glass substrate was submerged, and thus pretreated with an amine reagent. In Table 3 below, E12A is designated for the treated portion of the substrate and E12B is designated for the untreated portion. The treatment in the amine reagent was for 2 minutes, followed by rinsing with methanol. A polymer film was formed on the substrate as described above for E4. After drying with compressed dry air, the samples were soft-baked on a hotplate for 10 minutes at 110° C. and then hot-pressed at 260° C. for 30 minutes at a pressure of 765 psi using reinforced silicon rubber with an FEP release liner. After cooling, the polyimide on the non-silane treated portion partially delaminated and could be easily peeled back by hand.

TOF-SIMS surface spectrometry was performed on E12A and E12B using a TOF-SIMS M6 (IONTOF GmbH, Muenster, Germany) equipped with a 30 keV Bi primary ion beam, a 5 keV gas cluster ion beam, and a pulsed flood gun for charge neutralization. For each sample, 300 sec Ar-cluster sputtering was performed to clean off the surface prior to the negative secondary ion mapping. Analysis areas were constrained to 500×500 μm$^2$, while maintaining a primary ion dose density of 1012 ions/cm$^2$ or below to ensure static SIMS conditions (probe depth of 2 nm).

In particular, the polyimide-glass laminate that was pretreated (E12A) showed a relatively higher surface content of CNO$^-$ species. The peak area of the secondary ion of interest (CNO$^-$) is normalized by a characteristic peak that represent the matrix materials. For polyimide films, fragment ion peaks, molecular ion peaks, or hydrocarbon peaks such as $C_3N^-$, $C_7^-$, $CF_3^-$, $C_7H_4NO^-$ can be used. The relative peak area ratios from similar samples can be calculated to compare the relative amounts of related species. The normalized peak area ratios of E12A and E12B showed a greater than 10% increase for CNO$^-$ related species when treating the inorganic substrate with an amine reagent prior to lamination. This can be assigned to the formation of additional C—N bonds and/or species with amide functional groups at the interface. It is noted that E12A also showed a higher OH$^-$ signal (not shown) in its spectra, which could suggest more hydroxyl groups are also present at the interface.

$$\text{Relative peak area ratio} = \frac{\text{Intensity of } CNO^-}{\text{Intensity of a characteristic peak from matrix}}$$

TABLE 3

| Example | E12A | E12B | Change (%) |
|---|---|---|---|
| Amine reagent | 1% | none | |
| CNO/CF$_3$ ratio | 2.4 | 1.9 | 26 |
| CNO/C$_3$N ratio | 7 | 5 | 40 |
| CNO/C$_7$ ratio | 34 | 28 | 21 |

Comparative Example 5 and Example 13

For Comparative Example 5 (CE5), a borosilicate glass substrate (Corning® EAGLE XG® Slim Glass, 100×100×0.7 mm) was cut into 25.4×100×0.7 mm sections using a laboratory glass cutter. The glass pieces were rinsed with acetone and then methanol and dried using compressed dry air. The samples were individually placed in a Pyrex® bottle with the silane solution (1 wt % AEAPTMS in MeOH/H$_2$O, 95/5 v/v) and completely submerged into the solution containing the amine reagent. The treatment in the amine reagent was for 2 minutes, followed by rinsing with methanol. After drying with compressed dry air, the samples were soft-baked on a hotplate for 30 minutes at 80° C.

The polyamic acid solution composition described above for E4-E10, having a composition of 6FDA 1.0//TFMB 0.75/HMD 0.25, was used to coat the glass substrate. Approximately 50 ml of coating solution containing 20 wt % of the polyamic acid in DMAc was degassed by holding it overnight in a refrigerator. It was subsequently coated onto the silane treated glass substrate using a doctor blade. The polymer was cast with a clearance of 15 mil to produce a film approximately 1 mil in thickness after curing. The coated glass plate was heated to 80° C. for 30 minutes on a hot plate before placing it into the oven. The furnace was then purged with nitrogen and heated according to the following temperature protocol:

25 to 50° C. (5° C./min), hold at 50° C. for 5 minutes;
50 to 150° C. (7° C./min), hold at 150° C. for 10 minutes;
150 to 250° C. (7° C./min), hold at 250° C. for 10 minutes;
250 to 300° C. (7° C./min), hold at 300° C. for 5 minutes.

The film was removed "hot" from the oven after heating to 300° C. for 5 minutes and allowed to cool in air.

For Example 13 (E13), Corning® Eagle XG® glass (100×100×0.7 mm) was silane treated in a 0.3 vol % AEAPTMS solution, as described above for E1-E4. A film, with a monomer composition of 6FDA 1.0//TFMB 0.5/HMD 0.5 as described above for E1-E3, was placed on top of the Corning® Eagle XG® glass. FEP film was used as a release liner inside of high temperature silicone rubber mats. The sample was pressed at 290° C. for 30 minutes at a pressure of 537.5 psi.

Secondary ion mass spectroscopy was used to examine compositional changes through the thicknesses of the polymer layers of CE5 and E13.

Figure 1B:
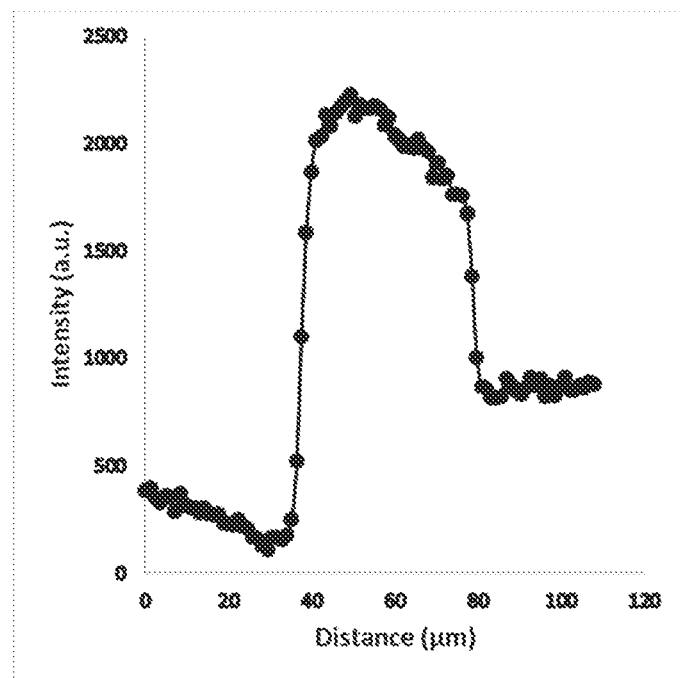
Figure 2A:
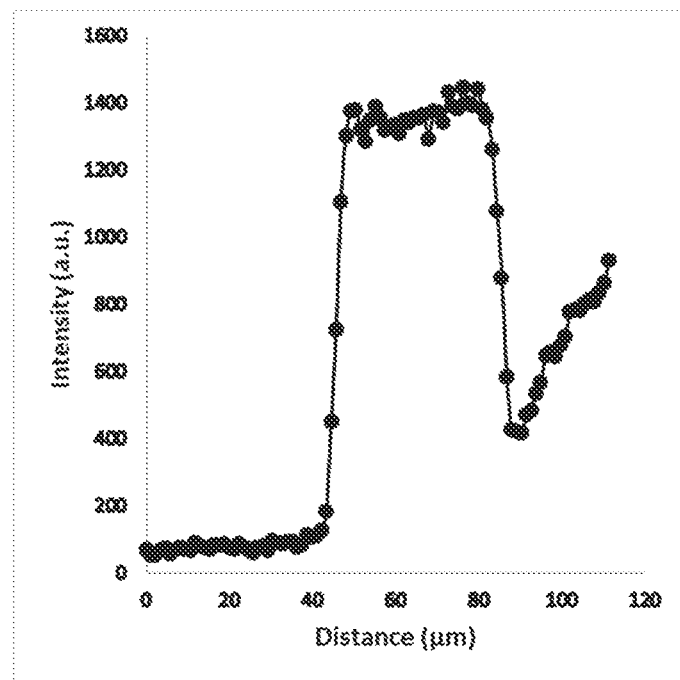
FIGS. 2A and 2B are the cross-sectional intensity profiles of CE5 for CN− species and CNO− species, respectively.
Figure 2B:
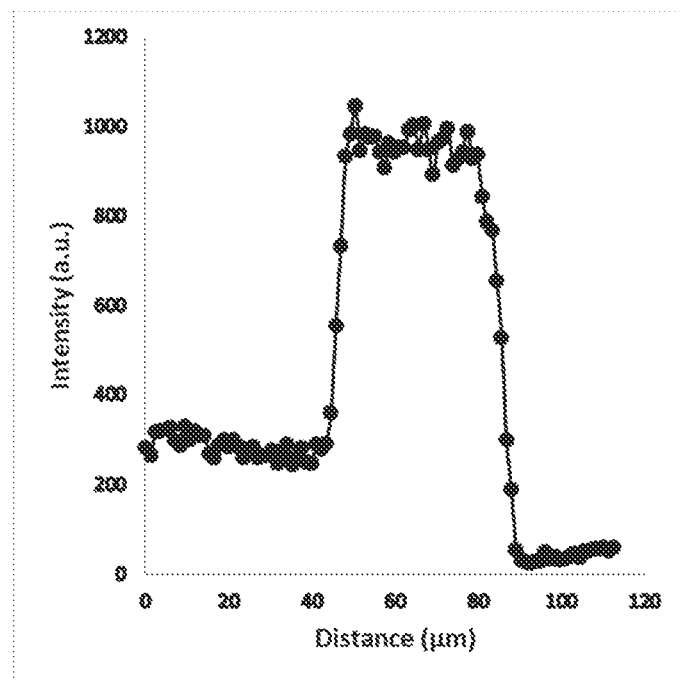

Mechanically polished cross sections were examined using the TOF-SIMS M6 as described above. Analysis areas were constrained to 150×150 µm² under delayed extraction mode to maintain good mass and lateral resolutions. Line scan profiles were then extracted from the secondary ion maps to examine the intensity profile of different secondary ions through the thickness of the polymer layer. FIG. 1A is the cross-sectional intensity profile of E13 for CN⁻ species moving through the inorganic substrate (0 to about 40 µm), polymer layer (about 40 to about 80 µm) and the binder material used to cross-section the laminate (about 80 to about 110 µm). FIG. 1B is a similar intensity profile for CNO⁻ species in E13. FIGS. 2A and 2B are similar cross-sectional intensity profiles for CE5. As can been seen in FIGS. 1A and 1B, from an interface where the inorganic substrate contacts the polymer film layer (at about 40 µm on the x-axis), line-profiles of both the CN⁻ and the CNO⁻ signals decrease as they move away from the interface and into the bulk of the polymer film layer. In comparison, for CE5, FIGS. 2A and 2B, the line-profiles are relatively unchanged.

Example 14

For Example 14 (E14), a curable resin coating composition was coated onto a polymer film layer and cured, followed by lamination onto an inorganic substrate. The curable resin coating composition was prepared by mixing Ebecryl™ 8602 (45 parts per weight, Allnex, Germany), Photomer® 4356 (20 parts per weight, IGM Resins USA Inc., Charlotte, NC), Sartomer SR399 (20 parts per weight, Arkema Inc., Exton, PA), Ebecryl™ LED 02 (10 parts per weight, Allnex), and Esacure KTO 46 (5 parts per weight, IGM Resins) in propylene glycol methyl ether acetate (166.67 parts per weight). The resulting mixture was filtered (pore size 0.2 µm, Whatman™), and then OPTOOL DAC-HP (1 part per weight, commercially available from Daikin Industries, Ltd., Japan) and NANOBYK-3601 (1 part per weight, BYK USA Inc., Wallingford, CT) were added, followed by filtration (pore size 1.0 µm, Whatman™). The final concentration range of the coating composition was adjusted to 20 to 60 wt % solids through further dilution with either propylene glycol methyl ether acetate, methyl isobutyl ketone, or 2-pentanone.

The polymer film was prepared as described above for E2 and had a dry film thickness of 25 µm. The curable resin coating composition was coated onto the polymer film using a slot die coater (nRad System, nTact, Dallas, TX) using a shim thickness of 2 mil at a coating speed of 26 mm/s and a coating flow rate of 80 µl/s. The coating solvents were removed at 90° C. and the curable resin coating composition was cured by passing the sample twice through a Fusion F300S UV curing system (Heraeus Noblelight America LLC, Gaithersburg, MD) equipped with a D bulb lamp (radiation energy output from 100 to 440 nm) at a belt speed of 24 ft/min. The dry thickness of the hard coat formed from the curable resin coating composition was 5 µm.

Corning® Eagle XG® glass (100×100×0.7 mm) was silane treated in a 0.3 vol % AEAPTMS solution, as described above for E1-E4. The polymer film with a hard coat was placed on the inorganic substrate with the polymer film layer in contact with the inorganic substrate. The sample was hot-pressed at 240° C. and 419 psi for 30 minutes using reinforced silicon rubber with an FEP release liner as described above. The adhesion to the glass was good.

What is claimed is:

1. An article comprising:
   an inorganic substrate comprising a material comprising a ceramic, a glass, a glass-ceramic or a mixture thereof, wherein the material comprises:
      a metal cation selected from the group consisting of silicon, aluminum, titanium, zirconium, tantalum, niobium and mixtures thereof; and
      oxygen;
   a polymer film layer comprising a polymer comprising an imide group, wherein, from an interface where the inorganic substrate contacts the polymer film layer, a line-profile of a CNO⁻ signal from negative secondary ion mass spectroscopy decreases as it moves away from the interface and into the bulk of the polymer film layer; and
   a hard coat layer adhered to the polymer film layer on a side opposite the inorganic substrate, wherein the hard coat layer is formed from a curable resin coating composition.

2. The article of claim 1, wherein the polymer comprising an imide group is selected from the group consisting of polyimides, poly(amide-imides), poly(ether-imides), poly(ester-imides), copolymers comprising amide, ester or ether groups, and mixtures thereof.

3. The article of claim 2, wherein the polyimide is derived from a dianhydride, a fluorinated aromatic diamine and an aliphatic diamine.

4. The article of claim 3, wherein the dianhydride comprises an alicyclic dianhydride.

5. The article of claim 1, wherein the inorganic substrate comprises glass.

6. The article of claim 1, wherein the metal cation comprises silicon.

7. The article of claim 1, wherein a Mode I Interlaminar Fracture Toughness ($G_{Ic}$) between the inorganic substrate and the polymer film layer is 9 J/m² or more.

8. The article of claim 1, wherein the polymer film layer has a $T_g$ of 300° C. or less.

9. The article of claim 1, wherein the article has a b* of 1.25 or less and a yellowness index of 2.25 or less when measured using the procedure described by ASTM E313 at a thickness of 25 μm.

10. The article of claim 1, wherein the article has a haze of 15% or less and an L* of 93 or more when measured at a thickness of 25 μm.

11. An impact-resistant article comprising the article of claim 1.

12. A penetration-resistant article comprising the article of claim 1.

13. A sound-reducing article comprising the article of claim 1.

14. An article comprising:
an inorganic substrate comprising a material comprising a ceramic, a glass, a glass-ceramic or a mixture thereof, wherein the material comprises:
a metal cation selected from the group consisting of silicon, aluminum, titanium, zirconium, tantalum, niobium and mixtures thereof; and
oxygen;
a polymer film layer comprising a polymer comprising an imide group, wherein, a Mode I Interlaminar Fracture Toughness ($G_{Ic}$) between the polymer film layer and the inorganic substrate layer is 9 J/m² or more; and
a hard coat layer adhered to the polymer film layer on a side opposite the inorganic substrate, wherein the hard coat layer is formed from a curable resin coating composition.

15. The article of claim 14, wherein the polymer comprising an imide group is selected from the group consisting of polyimides, poly(amide-imides), poly(ether-imides), poly(ester-imides), copolymers comprising amide, ester or ether groups, and mixtures thereof.

16. The article of claim 15, wherein the polyimide is derived from a dianhydride, a fluorinated aromatic diamine and an aliphatic diamine.

17. The article of claim 16, wherein the dianhydride comprises an alicyclic dianhydride.

18. The article of claim 14, wherein the inorganic substrate comprises glass.

19. The article of claim 14, wherein the metal cation comprises silicon.

20. The article of claim 14, wherein the article has a b* of 1.25 or less and a yellowness index of 2.25 or less when measured using the procedure described by ASTM E313 at a thickness of 25 μm.

21. The article of claim 14, wherein the article has a haze of 15% or less and an L* of 93 or more when measured at a thickness of 25 μm.

22. An impact-resistant article comprising the article of claim 14.

23. A penetration-resistant article comprising the article of claim 14.

24. A sound-reducing article comprising the article of claim 14.

25. The article of claim 14, wherein the polymer film layer has a $T_g$ of 300° C. or less.

* * * * *